United States Patent [19]

Roberts

[11] 4,118,788
[45] Oct. 3, 1978

[54] ASSOCIATIVE INFORMATION RETRIEVAL
[75] Inventor: Charles Sheldon Roberts, Holmdel, N.J.
[73] Assignee: Bell Telephone Laboratories, Incorporated, Murray Hill, N.J.
[21] Appl. No.: 775,114
[22] Filed: Mar. 7, 1977
[51] Int. Cl.² .................. G06F 15/40; G11C 15/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,221,308 | 11/1965 | Petersen et al. | 364/900 |
| 3,302,186 | 1/1967 | Raser et al. | 364/900 |
| 3,448,436 | 6/1969 | Machol, Jr. | 364/900 |
| 3,729,712 | 4/1973 | Glassman | 364/900 |
| 3,947,825 | 3/1976 | Cassada | 364/900 |

Primary Examiner—Gareth D. Shaw
Assistant Examiner—Thomas M. Heckler
Attorney, Agent, or Firm—Barry H. Freedman

[57] ABSTRACT

Associative retrieval of data via the technique of superimposed code words is accomplished by circuitry which automatically generates the codes, and which searches through stored code words to find the ones that match a given query code. Code generation is performed using pseudo-random techniques that are reproducible, obviating the need for a pre-prepared code dictionary. Identification of the codes that meet a match requirement is accomplished by logically AND'ing selected bits from the stored codes, said selection being determined by the query code.

24 Claims, 22 Drawing Figures

FIG. 1

| RECORD ID | NAME | HSE NUM | STREET | TOWN | |
|---|---|---|---|---|---|
| 0 | BILLS TOWING SERVICE | 232 | EVERGRN AV | CNTRL ISLIP | 100 |
| 1 | BOBS AUTO RADIATOR | 1848 | JERICHO TPK | HNTGTN | 101 |
| 2 | BOBS COUNTRY LINE GULF | 940 | MAIN | FRMGDL | 102 |
| 3 | BOBS DELICATESSEN | 232 | E MAIN | E ISLIP | 103 |
| 4 | CONSUMER DISTRIBUTING CO | 410 | UNION BLVD | W ISLIP | 104 |
| 5 | GUARDIAN AUTO SALES | 813 | MONTAUK HWY | BAYPRT | 105 |
| 6 | HOLLYWOOD BARBER SHOP | 320 | MAIN | HNTGTN | 106 |
| 7 | MORROWS RESTAURANT | 813 | E JERICHO TPK | HNTGTN STA | 107 |
| 8 | PARK AVENUE DELICATESSEN | 410 | PARK AV | HNTGTN | 108 |
| 9 | RODS GULF STATION | 410 | MONTAUK HWY | W ISLIP | 109 |

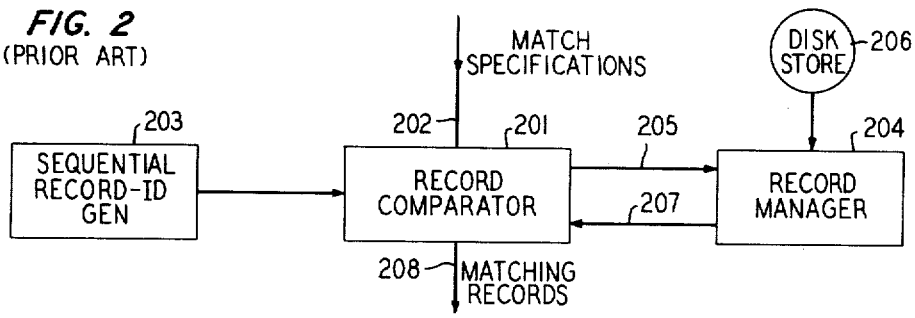

FIG. 2 (PRIOR ART)

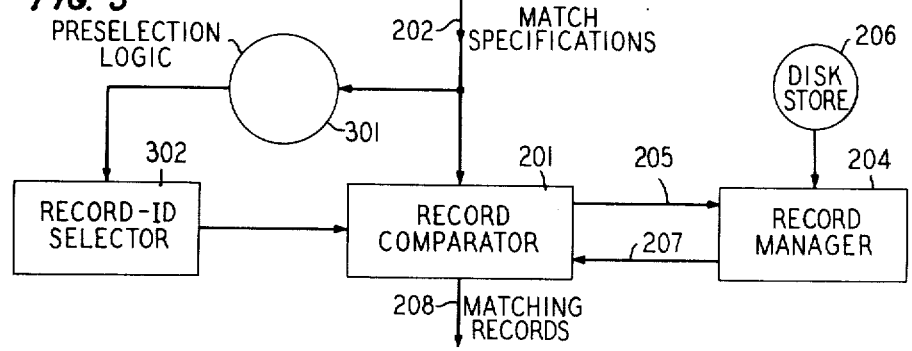

FIG. 3

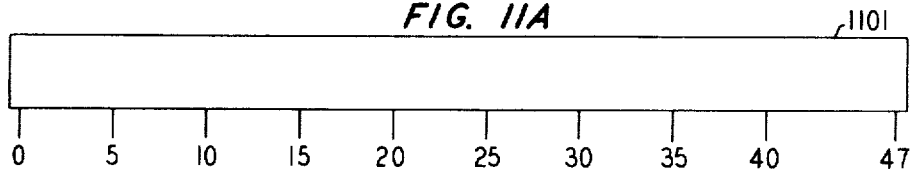
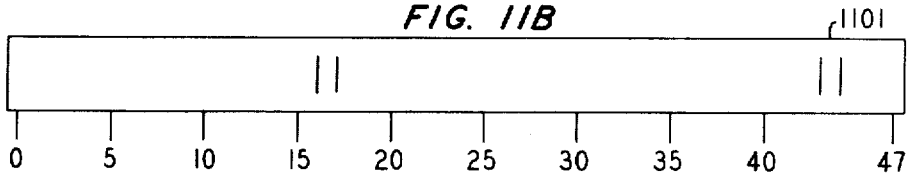
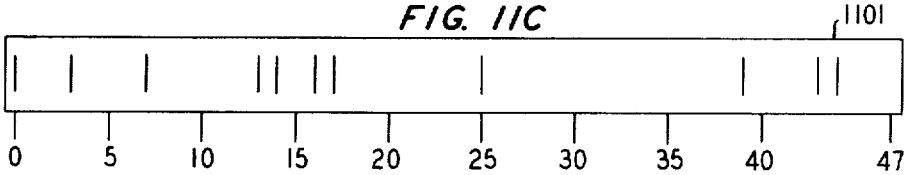
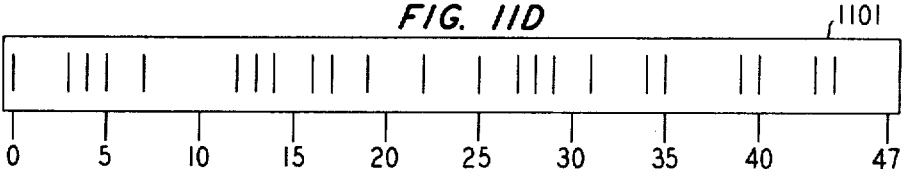
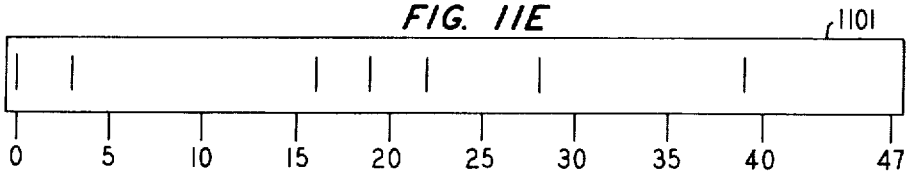

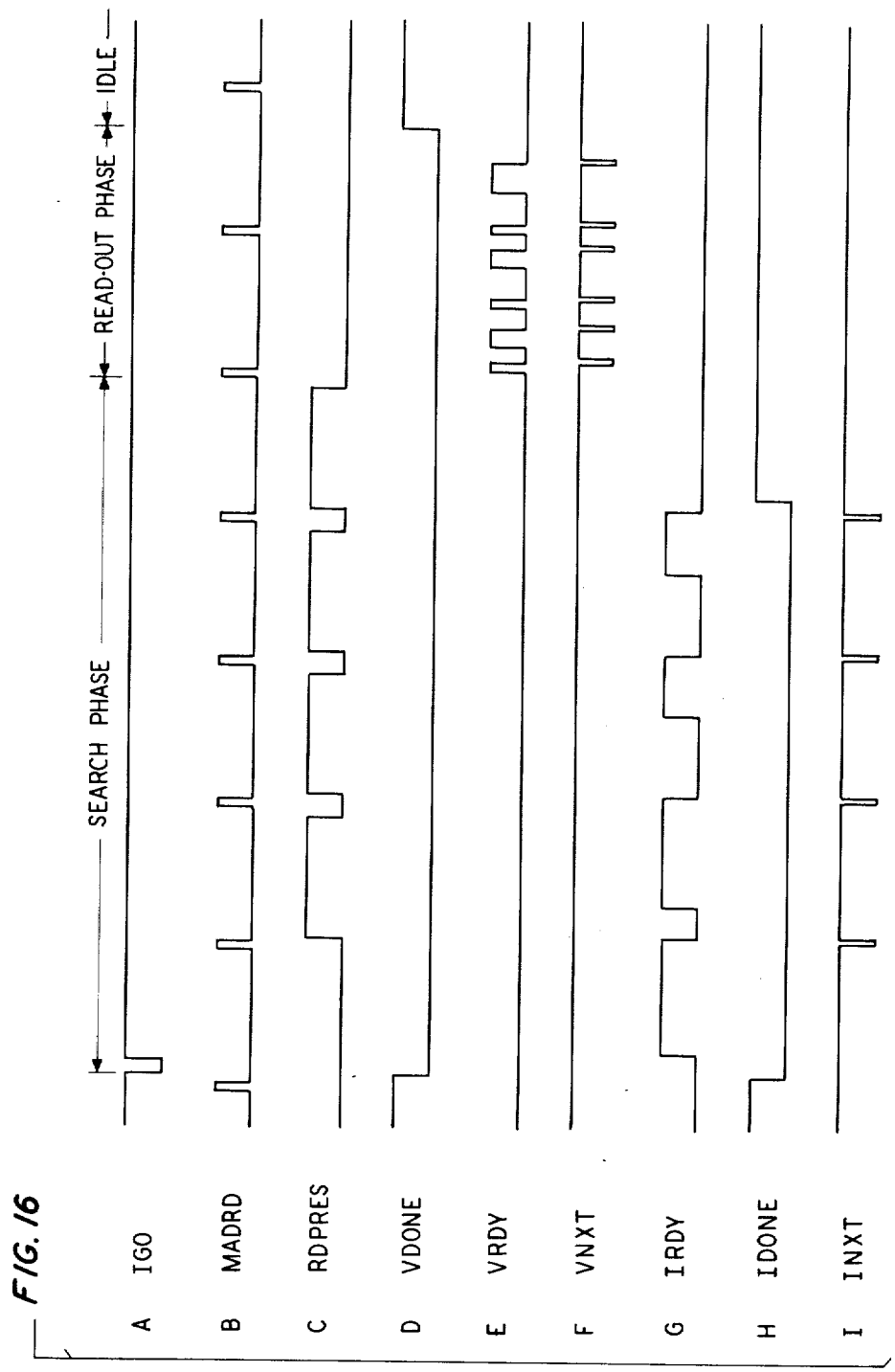

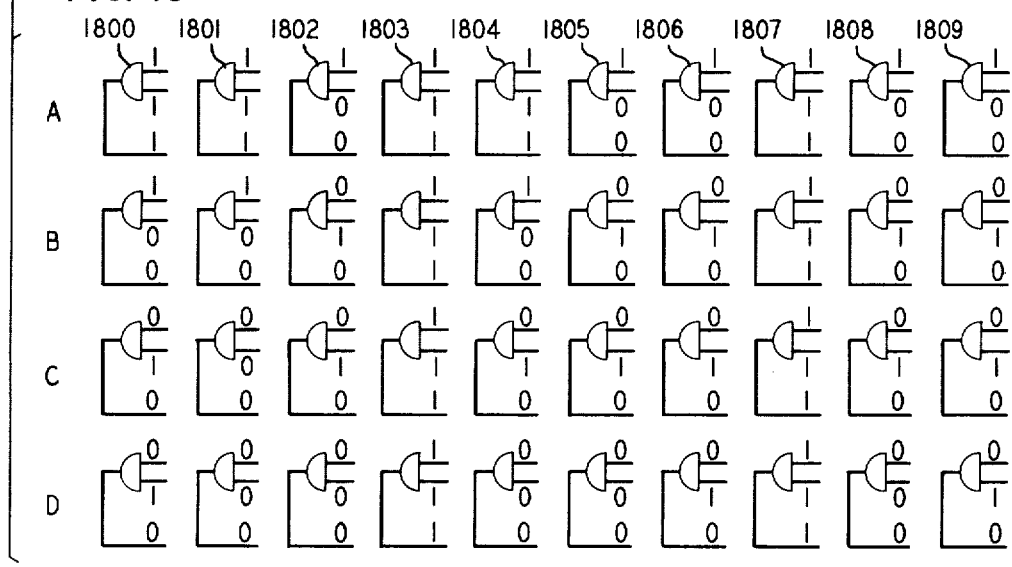

ASSOCIATIVE INFORMATION RETRIEVAL

BACKGROUND OF THE INVENTION

1. Field of the Invention

The present invention pertains generally to a technique for searching through a collection of records to retrieve, select or identify those records which have particular or desired attributes, and specifically to such a technique wherein superimposed code words are utilized to catalogue or identify the records.

2. Background of the Invention

In a recent article, John R. Pierce wrote "after twenty-five years of extraordinary progress, the computer industry is ready to enter its infancy." While the wisdom of this statement with respect to the computer industry in general may be arguable, it does appear to accurately and succinctly sum up the present state of affairs in the segment of the computer industry that involves information retrieval. During the last several years, man's ability to collect and accumulate data in a computer has grown dramatically; however, his ability to interact with the stored information has not kept pace with this growth. Rather, the powerful interactive capabilities of the general purpose computer have become inaccessible and even mystical to the vast majority of our population, since programming techniques often require the user to be too intelligent and to known too much before they can obtain any useful output from a computer. Since further advances in device technology promise to bring us more memory and larger capability in the near future, the ability to sort through and extract from the stored data, that which is needed, will become even more significant.

One fact of information retrieval that is the subject of the present invention is the technique of associative retrieval; this technique, if properly implemented, can play an important part in creating a flexible query system that is useable by people having only a small amount of special training. Broadly speaking, associative retrieval comprehends the selection or identification of one or more units of information based only on a specification of part of the unit's contents. At present, computers do not operate associatively. Rather, retrieval is based on foreknowledge of the exact memory location in which the desired information is stored. However, the human being, while unable to store amounts of data as large as that stored in a computer, has a superior ability to retrieve some unit of stored information on the basis of any of a large variety of informational clues. Thus, a broad object of the present invention is to provide an associative retrieval technique useable in conjunction with computers capable of storing large collections of data.

One prior art technique, originated in the 1940's, that is designed to permit associative retrieval in mechanical type systems rather than in conjunction with computers, is sometimes referred to as "Zatocoding". A complete description of a Zatocoding system, including some of the background mathematics, is contained in British Pat. No. 681,902 issued to Calvin Mooers on Oct. 29, 1952. In the Zatocoding system, a file or collection consisting of a large number of individual records is first examined to determine what attributes of each record are significant for purposes of retrieval. For example, in a file including records which represent particular books in a library, useful attributes might be the author, title, publication date, subject matter, Dewey decimal classification, et cetera, of each work; in a file of telephone subscribers' directory listings, the attributes of each listing or record would likely comprise the subscriber's name, street number, street and town, among others.

Next, each attribute value (i.e., the name of the author of a book being catalogued, the title of the work, and so on) is assigned a code indicative of the attribute value, and all of the codes describing each of the attribute values associated with a record are combined to yield an overall code word denominated a "superimposed code word" for that record. These superimposed code words are then stored in an auxiliary file. In the Zatocoding systen, this file is generated by selectively notching various edge positions in a record medium or card; corresponding between the cards and the records they represent is maintained simply by writing an appropriate notation on each card.

When it is desired to retrieve or identify those records in the collection that have one or more particular or desired attribute values, a query code or match specification is generated using techniques similar to those stated above for encoding the records of the collection. The superimposed code words stored in the auxiliary file are then examined to determine which ones include, in a Boolian logic sense, the query code. In the case where notched cards are employed, this examination is accomplished by inserting long pins or needles through holes formed in the card edges, such that those cards that are notched in the particular positions specified by the query code are separated from those that are not. Since the superimposed code technique embodies random coding principles, to be discussed hereinafter, which only assure that the cards thus selected will include (but not be limited to) those which satisfy the match specification, the retrieval step is completed by conducting, in any well-known manner, a linear search to remove "false drops," i.e., records which do have codes corresponding to the match specification code but which include undesired attribute values, and to retain only the remaining cards corresponding to desired records of the collection.

While many of the features of the Zatocoding system, including the theory of superimposed coding, may be quite valuable in enabling associative retrieval, it nevertheless remains that the technique was generally oriented toward manual type storage systems and was never expanded so as to be useful in the environment of modern day computers. This then yields another object of the present invention, namely, the adaptation of hardware which permits one to utilize superimposed coding in conjunction with general purpose computers, instead of with needling or other mechanical apparatus.

Other difficulties with the presently known manner of using superimposed coding for associative retrieval will be illustrated by a brief discussion of the assignment of superimposed codes to the records they represent. In Zatocoding, a list of random numbers in a range between 0 and $b$ is initially generated, and numbers from the list are assembled in groups of K numbers. A code dictionary containing a listing of the groups of numbers previously assigned to other attribute values is next consulted, manually, to determine if the attribute value has appeared previously in the collection. If so, the same code assignment is (and must be) retained; otherwise, the next available group of numbers is assigned as the code for the attribute value, and the assignment is entered in the dictionary for further use in succeeding code assignments. Finally, the codes for each of the attribute values of a given record are combined to form the superimposed code word by a process, again usually manually performed, which amounts to logically OR'λ ing together the numbers in each of the number group, so that "duplicate" or overlapping numbers are eliminated. The foregoing procedure is also used in the generation of a match specification or query code needed to retrieve records having desired attribute values from the collection; the codes for each individual attribute value must, however, be located in the dictionary and then combined as set forth above.

Besides the fact that the aforedescribed coding operations are largely manual, its most severe deficiency is the need to maintain and refer to a code dictionary each and every time a new record is entered in the data base and each time a query or search is undertaken. If a dictionary entry is miscatalogued, misplaced or otherwise improperly filed, correct functioning is frustrated. Eventually, the code dictionary itself can become quite large and cumbersome, further limiting the usefulness of the technique. Accordingly, a further object of the present invention is to accomplish the generation of code words of the type described above in an automatic manner that does not require the maintenance of a code dictionary or other listing which must be manually accessed.

SUMMARY OF THE INVENTION

The foregoing and additional objects are achieved in accordance with the present invention by the provision of fully automatic special purpose hardware which may be used in conjunction with general purpose computers to permit associative retrieval of data via the technique of superimposed codes. With respect to the formation of the superimposed code words themselves, the present invention permits elimination of the code dictionary by using a pseudo-random generation technique; this technique maintains the degree of statistical randomnes needed to enable associative retrieval without an unduly large number of false drops, and yet provides repeatable results that make "record-keeping" unnecessary. This technique, briefly, generates codes for the individual attribute values of each record (or each query) by assigning a unique (generally numerical) intermediate code to the value, mapping the intermediate code into an integer value lying within a predefined range, generating a particular sequence of pseudo-random numbers in response to the integer value, and finally scaling the psuedo-random numbers to yield a code having a desired range and weight (number of bits of a given polarity). The overall code word representative of the record (or the query) is then formed by logically OR'ing together the individual words.

In accordance with another aspect of the invention, mechanical sorting by needling or otherwise is avoided during a search of the stored code words by apparatus which logically AND's together selected bits of the stored code words, said selection being determined by the query code or match specification. The records culled from the collection by this process must include all records which possess the attribute values being sought; false drops are then eliminated by a linear search using conventional techniques.

BRIEF DESCRIPTION OF THE DRAWINGS

The foregoing and additional features and advantages of the present invention will be more fully appreciated from a consideration of the following detailed description, when read in light of the accompanying drawing in which:

FIG. 1 is an illustration of 10 records which might be included in a collection being searched;

FIG. 2 is a block diagram of a prior art data retrieval system, i.e., straightforward sequential search apparatus;

FIG. 3 is a block diagram showing the interrelation between the system of FIG. 2 and the apparatus of the present invention;

FIGS. 11a - 11d are graphic representations showing the formation of superimposed code words by the combination of individual codes;

FIG. 11e is a similar representation of a query mask;

FIG. 16 is a timing diagram for the circuit of FIG. 15;

FIG. 17 is yet another example of superimposed code words and a query mask; and

FIG. 18 is a graphic representation of the AND'ing process performed by the circuit of FIG. 15 to determine which SCW's of FIG. 17 satisfy the query mask shown therein.

DETAILED DESCRIPTION

1. Nomenclature

Figure 4:
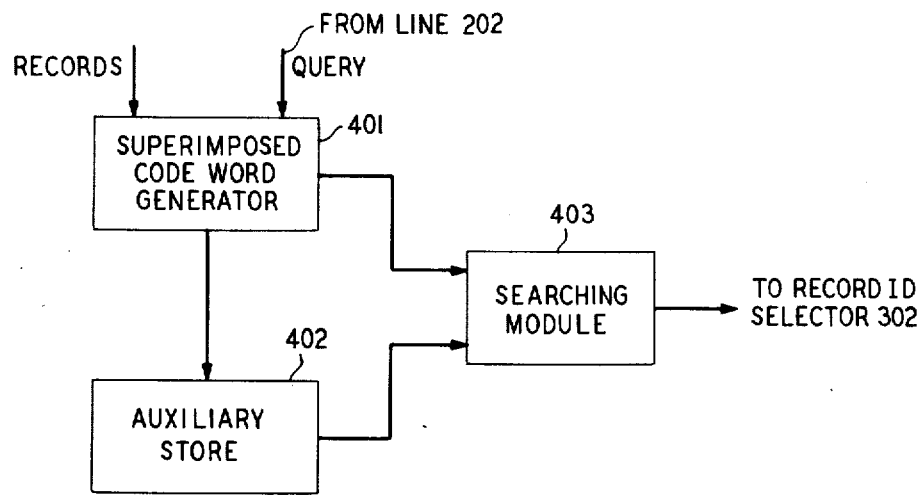
FIG. 4 is a block diagram showing the overall interrelationship of various portions of the present invention.

The purpose of the present invention is to permit the identification, selection, or retrieval (all used synonymously) of particular records in a collection $E = \{R_1, R_2, R_3, \ldots R_N\}$ of records. Each record $R_1$ in the collection has a set of attribute or key values $K_i = \{K_{i1}, K_{i2}, K_{i3}, \ldots K_{ir_i}\}$, where the number $r_i$ of attribute values may vary from record to record. Examples of collections which could be searched utilizing the present invention are the subscriber listings in a telephone directory, books in a library, inventory stocked in a warehouse, or photographs in an album. In the first and second examples, each individual subscriber listing and book in the library would constitute a record, as that term is used; in the case of an inventory of, say, fabrics, each style would be a record, even though no written indicia is involved. Similarly, a record might be a photograph, an oscillogram or a song.

In the photograph collection, the attributes of interest might be the subject matter of the photograph, the name of the photographer, the type of film used, exposure time and lens setting, the date taken, the date and place of publication, and so on. Attributes for inventory parts might be a part number and name, manufacturer, cost and sales price, reorder information, and so on. For the library collection, attributes would likely include standard card catalogue data, while the telephone book entries could, if desired, have attributes of class of service, type of equipment, and billing information in addition to the standard attributes of name, street number, street and phone number.

For a given record, the "value" of an attribute (attribute value), as that term is used herein, is generally given by an alphanumeric designation having one or more characters. Thus for a telephone listing:

Rod's Gulf Station, 410 Montauk Hwy, W. Islip the value of the name attribute is "Rod's Gulf Station," the value of the street number attribute is "410", the value of the street attribute is "Montauk Hwy" and so on. For a particular photograph, the subject matter attribute may have a value "sunset," with the photographer, location, exposure and speed attributes having values "R. Jones," "Grand Canyon", "2.8" and "1/50", respectively. Since the present invention is designed for associative retrieval wherein only part of the attribute values of a record are known, it is fundamental to the technique that attribute values be capable of modification, division or subclassification using any one of a number of possible schemes, which need not be mutually exclusive. For example, the attribute value "Rod's Gulf Station" may be supplemented (or replaced by) attribute values of "Rod's," "Gulf" or "Gulf Station," or any combination thereof. Furthermore, attribute values which are implied, such as "gasoline," "car service," and so on, may be used, if desired. in addition to explicit values. In certain other instances, it may be desirable to subdivide an attribute value in yet other ways; thus the characters in the words "GULF" may be grouped in pairs (digrams) to yield values "GU," "UL," and "LF." In short, the attribute values of a given record may include a plurality of alphanumeric characters or character groups, each of which represents or describes the record being encoded in some logical fashion.

In associative retrieval generally, desired records D are selected from the collection if they satisfy or possess one or more predetermined attribute values; an "inclusive query" or "query" set $Q = \{Q_1, Q_2, Q_3 \ldots Q_p\}$ includes p predetermined attribute values, and the desired records are represented notationally $$D = \{R_i | R_i \in E, Q \in K_i\}, \quad (1)$$

which reads: desired records are a set of records $R_i$ such that (1) $R_i$ is in the collection E and (2) the predetermined attribute values Q are among the attribute values $K_i$ of the record. However, since the present invention utilizes superimposed coding rather than simple linear searching, the selection or retrieval process may produce a set of one or more "false drops" F in addition to the desired records D. Stated differently, superimposed coding will select or retrieve a set D' of records, where $D \leq D'$ and $D' = D \cup F$; by properly selecting the encoding parameters, the ratio of the set sizes $||F||/||D||$ will desirably be maintained at a small value. An example further illustrating the meaning of a false drop will be given in the succeeding section.

In superimposed coding, "superimposed code words" (SCW's) for each record are formed by (1) encoding each attribute value of the record to form what will be referred to as an "individual code," and (2) combining the individual codes to form the SCW. Superimposed code words which are combinations of the attribute values that are the object of a search are formed, as will be illustrated hereinafter, using the same two-step technique; however, these SCW's are denominated "query words" or "match specifications." While the novel technique, taught by the present invention, of converting attribute values first to individual codes and then to SCW's or queries will be described more fully hereinafter, it may be stated here that the encoding process begins with an attribute value which is, in general terms, alphanumeric (i.e., a number or numbers and/or a letter or letters) and ends with a binary code representable as a string of ONES and ZEROES. It will be appreciated by those skilled in the art that alternate representations of a given binary code are possible, and are included in the intendment of the ensuing description. Furthermore, it will be understood that an alphanumeric character description of an attribute value can be converted, using many different code conversion techniques, to a different series of characters prior to encoding into individual codes in accordance with this invention. For example, the wellknown ASCII code converts the characters on a teletypewriter keyboard to a 7-bit binary code; the EBCDIC code also converts alphanumerics to an 8-bit binary code. These latter codes may be linearly converted to still other codes without changing the information content thereof. Accordingly, in the following description, the attribute values being encoded into an individual code will be represented, in general, as a stream of binary bits.

2. Basic System Architecture

A specific example will be helpful in understanding the overall interrelationship between the apparatus of the present invention and conventional data processing systems with which it operates. In FIG. 1, a collection of 10 records 100–109 consisting of business listings taken from the Suffolk County, New York, telephone directory is shown. Each record has been assigned an integer in the range 0 to 9 as its record-ID; if the file was stored in a computer memory, the record-ID could be regarded as the record's storage address, so that given the value of a record-ID, retrieval of the record's contents is easily achieved using state of the art techniques.

Using whole words and numbers as attribute values, a sample of associative retrieval might be to identify all records in the collection which contain the word "IS-LIP;" a correct response to this query would, of course, be the retrieval of records with ID's 0, 3, 4 and 9. A more complex query might require a match or more than one attribute value, for example, both "GULF" and "MONTAUK;" the correct answer here would be record 109. These retrievals could be made via a sequential search using prior art apparatus shown in FIG. 2. A match specification (in this case, the attribute value "GULF") is input to a record comparator module 201 via line 202. A record-ID generator 203 then generates an ordered sequence consisting of all of the record-ID's in the entire collection, in this example, the numbers 0 to 9. One at a time, each ID is passed to the comparator 201, which in turn sends the ID to a record manager module 204, via line 205, as part of a retrieve record command. Manager 204 is arranged to read the appropriate sectors of a memory such as disc storage unit 206, and to send the contents of the requested record back to comparator 201 via line 207. The comparator then makes a determination if the match specification is satisfied by the record just retrieved: if so, the desired record in output on line 208.

While the preceding retrieval technique will work, it is obviously impractical in that a search of an interesting real world collection could require many minutes or even hours to complete. Accordingly, the idea behind superimposed coding, as taught herein, is to speed up the file search by preselecting the record-ID values that are passed to comparator 201. As illustrated in FIG. 3, match specifications applied on line 202 are coupled to a preselection logic circuit 301 which is the essence of the present invention. This logic passes to record-ID selector 302 only those ID's which could possibly satisfy the query. In this way, comparator 201 is required to retrieve and compare a much smaller set of records, so that search time can be reduced by as much as a factor of $10^6$.

Preselection logic 301 of FIG. 3 may be generally configured as shown in FIG. 4. An auxiliary store 402 is used to store a file of the superimposed code words that are generated for each record in the collection by a code generator 401. One code word is generated for each of the N records in the collection; in typical system designs, auxiliary store 402 will have a capacity of 20-25 percent of that of primary store 206. Generator 401 is also used to form a match specification, based upon the inputs applied on line 202, and the specification is fed to one input of a searching module 403. As will be described in detail hereinafter, module 403 is arranged to determine which SCW's contained in store 402 satisfy the query; an indication of those that match is provided at the output of module 403 for transmission of record-ID selector 302 of FIG. 3.

3. Superimposed Code Word Generator

As stated previously, the present invention avoids the need for a code dictionary by automatically assigning a superimposed code word to each record in the collection, and to each query input into the system. The basic steps in code word generation are (1) formation of an individual code for each attribute value, and (2) combination of the individual codes into an SCW by logically OR'ing them together.

In the apparatus described hereinafter, individual codes assigned to attribute values are generally binary words having a width of $b$ bits. With one minor exception to be discussed later, the individual codes have a weight K: this means that the individual code contains K bits of one polarity and $b-K$ bits of the opposite polarity. For convenience, the K will be ONES with the remaining bits being ZEROES. The formation of the individual codes generally follows a four step procedure, which is summarized as follows:

A. The attribute value (as represented by a multibit numerical equivalent) is mapped into an integer value lying within a predefined range;

B. A particular sequence of pseudo-random numbers is generated in response to the integer value;

C. Each of the psuedo-random numbers in the sequence is scaled to a value between 0 and $b-1$; and D. The scaled numbers are used to determine the positions of the K ONE bits within the individual code word.

The purpose of the mapping step (step A) stated above may be defined in alternate terms: to transform an input bit string of arbitrary length $n$ into another bit string having a length $m$. In most useful applications $n > m$, but this need not always be true. Other restraints on the process are that it be reproducible, i.e., the same n-bit input string must always give the same m-bit output string. Still further, it is more desirable that the output bit string depend on all bits in the input, so that changing any one input bit changes the output bits in some way. Indeed, input strings that differ only slightly preferably yield outputs that differ substantially in numerical value when the $m$ bits of the output are thought of as a binary integer.

Figure 5:
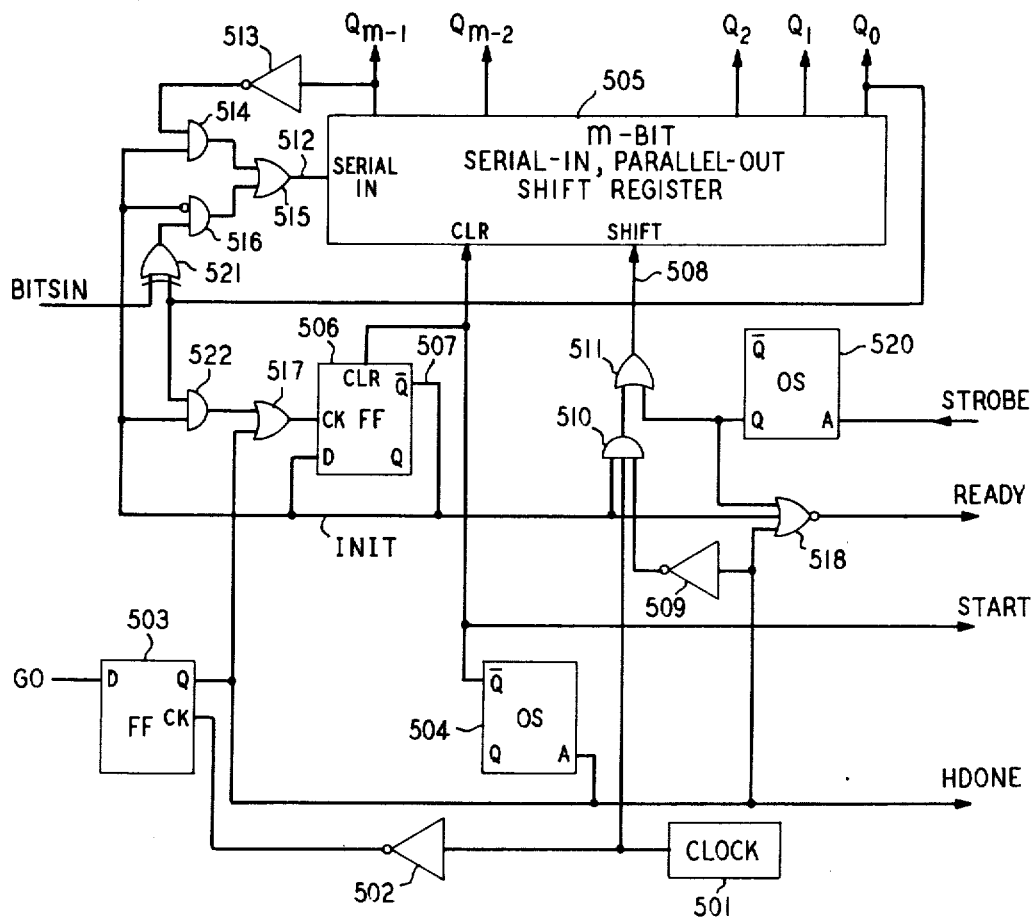
FIG. 5 is a block diagram of a hashing circuit constructed in accordance with the principles of the present invention.
Figure 6:
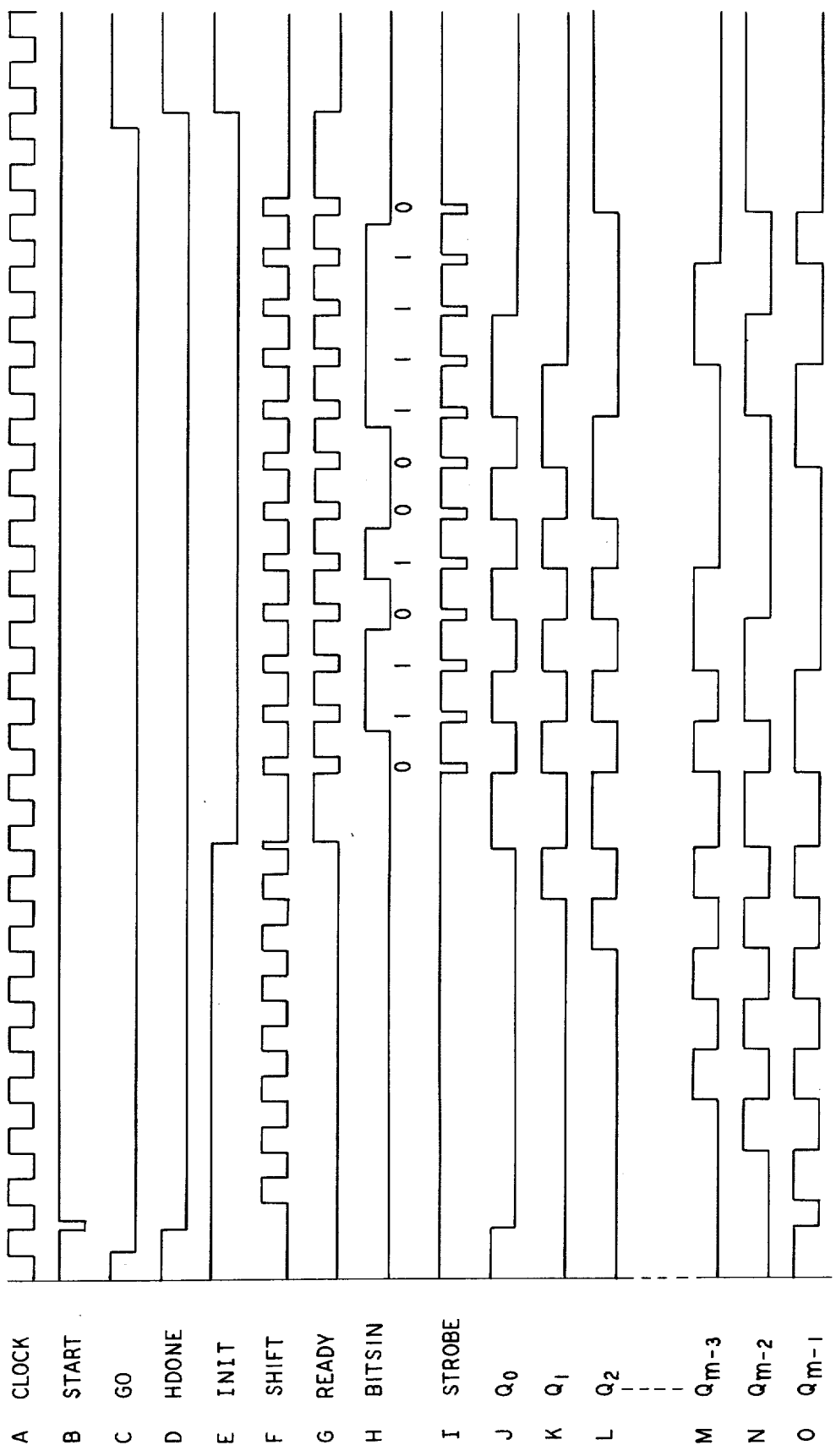
FIG. 6 is a timing diagram for the circuit of FIG. 5.

Apparatus for performing the mapping described above using a process called "hashing" is shown in block diagram form in FIG. 5; a timing diagram showing the levels present at various points within the circuit is shown in FIG. 6. When the circuit is idle, the input lead labeled "GO" is held at a high logic level, and the previously computed m-bits of output are present on the m output leads designated $Q_0$ through $Q_{m-1}$. To initiate the generation of the next m-bits, the GO lead is brought to a low logic level (FIG. 6, waveform C). At the next high/low transition of clock 501 (waveform A), which transition is inverted in inverter 502, the Q output of flip-flop 503 goes low, as shown in FIG. 6, waveform D. This low on the lead labeled HDONE causes a one-shot circuit 504 to produce a short negative going pulse on the output line labeled "START" (waveform B), which pulse is useful for synchronizing the circuit of FIG. 5 with other related circuits. With the "GO" input remaining low, the n-bits input to the circuit are applied on the input lead labeled BITSIN, under the control of the leads labeled STROBE and READY, as will be described hereinafter. When the n-bits have been entered, the "GO" lead is brought to the high state, causing HDONE to go high to indicate completion. At this time, the desired m-bit output will be present on leads $Q_0$ through $Q_{m-1}$.

The internal operation of the circuit of FIG. 5 is centered around an "m-bit serial-in, parallel-out" shift register 505, which may include, for example, TTL integrated circuits SN74164 manufactured by Texas Instruments Corp. Register 505, as well as a flip-flop 506, is initially cleared by the start pulse output of one-shot 504. Thus, the m-bits stored in register 505 are all low, and the $\bar{Q}$ output of flip-flop 506 on lead 507 labeled INIT (see waveform E) is high.

Shift register 505 is arranged to shift from left to right on each low to high transition on its "SHIFT" input line 508 (see waveform F). With HDONE low, the output of inverter 509 is high, as is INIT lead 507, so that AND gate 510 is enabled to pass pulses generated by clock 501 through to the SHIFT input of register 505 via an OR gate 511. Inspection of the circuit feeding the serial-in terminal 512 of register 505 will reveal that alternate highs and lows are shifted into position $Q_{m-1}$: at the first SHIFT pulse, $Q_{m-1}$ is low, so that inverter 513 supplies a high to one input of AND gate 514. Since the other input to gate 514 is the high INIT signal, OR gate 515 will pass a high to register 505 on line 512. At the next SHIFT pulse, $Q_{m-1}$ is high, so that the outputs of inverter 513 and AND gate 514 are low. The output of AND gate 516 is also low, by virtue of the inverted INIT signal applied at one of its inputs. Thus, the output of OR gate 515 couples a low on line 512 to the register 505. The foregoing procedure then repeats, so that after $m$ shifts, register 505 contains alternate highs and lows in its $m$ stored positions, with the rightmost position $Q_0$ being high. This high, together with the high on the INIT lead, are coupled through AND gate 522 and OR gate 517 to the clock input of flip-flop 506, toggling that flip-flop and causing INIT to go low. Now, AND gate 510 is disabled from passing further SHIFT pulses to register 505.

When INIT goes low, the output of NOR gate 518 goes high. This output, labeled READY (shown in waveform G) indicates to the external equipment (not shown) that the circuit is ready to accept, one bit at a time, the $n$-bit input that is to be processed. When the first input bit is presented on the BITSIN line, the external circuitry must concurrently send a short negative going pulse on the STROBE line to indicate to the circuit of FIG. 5 that it should process this bit. This pulse triggers one-shot 520 to produce a short positive going pulse which is passed through OR gate 511 to the SHIFT input of register 505. Concurrently, the high output of one-shot 520 is applied to NOR gate 518, causing the READY lead to become low for a short time; in this interval, the circuit "processes" the bit presented on the BITSIN line. When the output of one-shot 520 again goes low, the READY lead goes high again, and the circuit is then able to accept another input bit.

Each bit presented on the BITSIN leads is combined in exclusive OR gate 521 with the current contents of register 505 bit position $Q_0$; the result is then presented at the serial-in input 512 to register 505 via AND gate 516 and OR gate 515. The aforementioned SHIFT pulse on line 508 causes a right shift by one position and the process is then repeated for the next value presented on the BITSIN line. After the last bit of information is presented on the BITSIN lead, the GO lead is raised to a high level, HDONE then becomes high, and the process is complete. An example of the operation of the FIG. 5 circuit for the case where $m = 8$ is presented in the following table for a 12 bit ($n = 12$) value given by 011010011110 shown in waveform H; the signals present at output terminals $Q_0$, $Q_1$, $Q_2$, $Q_5$, $Q_6$ and $Q_7$ are shown in waveforms J through O of FIG. 6.

TABLE 2

| $Q_0$ | BITS IN | → | $Q_7$ |
|---|---|---|---|
| 1 | 1 | → | 0 |
| 1 | 0 | → | 1 |
| 0 | 1 | → | 1 |
| 0 | 0 | → | 0 |

From Table 1, it will be seen that the input $n$-bit value 011010011110 has been mapped into the $m$-bit output value 01001100. A table showing this and other examples of the conversion process achieved in the circuit of FIG. 5 is as follows:

TABLE 3

| Example No. | INPUT | OUTPUT |
|---|---|---|
| 1 | 0110 1001 1110 | 0100 1100 |
| 2 | 0100 1001 1110 | 0000 1100 |
| 3 | 0010 1001 1110 | 0110 1100 |
| 4 | 0010 1011 0110 | 0111 1000 |
| 5 | 0010 1011 0111 | 1111 1000 |
| 6 | 1010 1011 0111 | 1110 1000 |
| 7 | 0110 1001 | 1100 0011 |

Comparisons between examples 1 and 2 and examples 2 and 3 show that one bit changes in the input data do produce changes in the output data, as was desired in the restraints set forth above. Also, comparison between examples 1 and 7 shows that a change in the number $n$ of input bits also desirably changes the output mapped value. The outputs shown in Table 3 are easily converted from binary to decimal form; for $n = 8$, the output is mapped into the range of integers between 0 and $2^8 - 1 = 255$.

The next step (step B) of the process by which SCW's are assigned to attribute values is, as stated previously, to generate a particular sequence of pseudo-random numbers in response to the $m$-bit value generated in the preceding mapping process. This process, again, must be a reproducible or repeatable one: for any given $m$-bit input, the same output sequence must appear. A block diagram of apparatus which may be used to generate this sequence using the linear congruential technique described in D. E. Knuth, The Art of Computer Pro-

TABLE I

| AFTER STROBE PULSE | BITS IN | $Q_7$ | $Q_6$ | $Q_5$ | $Q_4$ | $Q_3$ | $Q_2$ | $Q_1$ | $Q_0$ |
|---|---|---|---|---|---|---|---|---|---|
| 0 | 0 | 0 | 1 | 0 | 1 | 0 | 1 | 0 | 1 |
| 1 | 1 | 1 | 0 | 1 | 0 | 1 | 0 | 1 | 0 |
| 2 | 1 | 1 | 1 | 0 | 1 | 0 | 1 | 0 | 1 |
| 3 | 0 | 0 | 1 | 1 | 0 | 1 | 0 | 1 | 0 |
| 4 | 1 | 0 | 0 | 1 | 1 | 0 | 1 | 0 | 1 |
| 5 | 0 | 0 | 0 | 0 | 1 | 1 | 0 | 1 | 0 |
| 6 | 0 | 0 | 0 | 0 | 0 | 1 | 1 | 0 | 1 |
| 7 | 1 | 1 | 0 | 0 | 0 | 0 | 1 | 1 | 0 |
| 8 | 1 | 1 | 1 | 0 | 0 | 0 | 0 | 1 | 1 |
| 9 | 1 | 0 | 1 | 1 | 0 | 0 | 0 | 0 | 1 |
| 10 | 1 | 0 | 0 | 1 | 1 | 0 | 0 | 0 | 0 |
| 11 | 0 | 1 | 0 | 0 | 1 | 1 | 0 | 0 | 0 |
| 12 |   | 0 | 1 | 0 | 0 | 1 | 1 | 0 | 0 |

Figure 7:
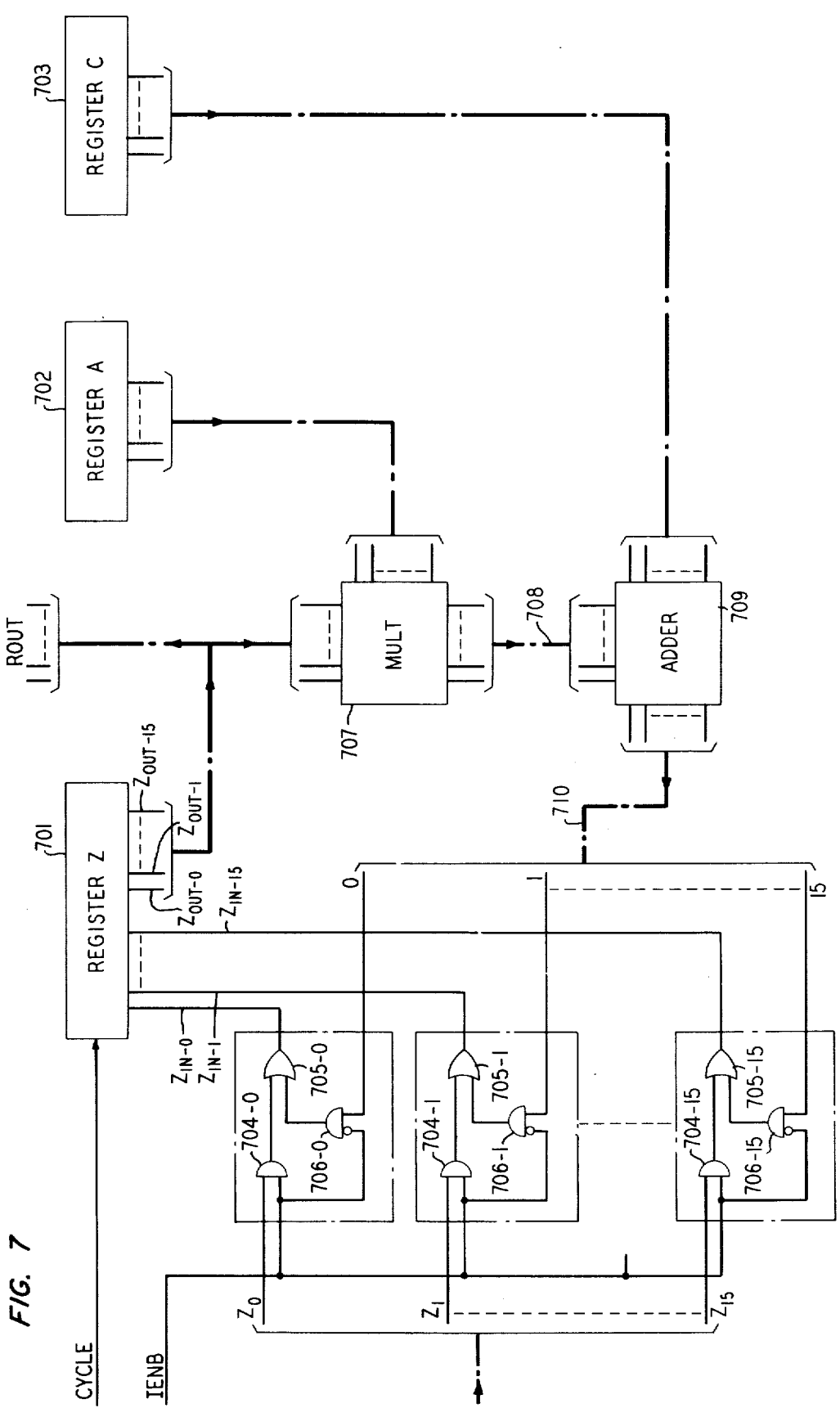
FIG. 7 is a block diagram of a pseudo-random number sequence generator constructed in accordance with the present invention.

The small arrows in the Table indicate that the value of $Q_6$ is derived from the previous value of $Q_7$, that $Q_5$ is derived from the previous value of $Q_6$, and so on. The value of $Q_7$ is, of course, determined by the exclusive OR function of $Q_0$ and bits-in from the previous line; this function is shown in Table 2.

gramming, Vol. 2, Sec. 3.2.1 (1969) is shown in FIG. 7. In this technique, a sequence of numbers Z is formed such that $$Z_i = [[A \times (Z_{i-1})] + C]_{modulo\ M},$$

where $A$ and $C$ are constants and $M$ is the desired number of bits in each word in the sequence. Other techniques for achieving a similar result do exist, and could instead be used.

In FIG. 7, registers 701, 702 and 703 are all $m$-bits wide; an acceptable and practical value for $m$ is $m = 16$. Register 701 includes $m$ input and output terminals labeled $Z_{in-0}$ through $Z_{in-15}$ and $Z_{out-0}$ through $Z_{out-15}$, respectively, and a further input lead labeled CYCLE. The latter input is arranged such that a positive going transition causes the value then present on the $Z_{in}$ lines to be read into and stored in the register; the same value is then available on output lines $Z_{out}$ until another pulse on the CYCLE line changes the stored value.

Registers 702 and 703 may be read-only memories which are initially loaded with particular $m$-bit numbers when the circuit is fabricated; once loaded, these numbers are not thereafter changed. While many acceptable numbers may be utilized, one pair of acceptable values for $m = 16$ are $A = 0100110011010101$ and $C = 0011011000011001$.

Operation of the pseudo-random number generator of FIG. 7 is started by initializing register 701 with the $m$-bit value output from lines $Q_0$-$Q_{m-1}$ of the circuit of FIG. 5. (It is now assumed that $m = 16$.) This is accomplished by (1) placing these bits on the input lines $Z_0$ through $Z_{15}$, (2) raising the lines IENB to the high state, and (3) sending a pulse to register 701 on the CYCLE line. The $Z_0$ input is thus passed through AND gate 704-0 and OR gate 705-0 to input $Z_{in-0}$; the other inputs $Z_1$-$Z_{15}$ are similarly applied. After applying the initialization pulse on the CYCLE line, IENB is placed in the low state, disabling AND gates 704 and enabling a second series of AND gates 706-0 through 706-15; IENB remains low until initialization is again desired.

The $m$-bit output of register 701 on lines $Z_{out}$ are applied to one set of inputs of a multiplier 707 which receives a second set of inputs from register 702. The multiplier is arranged to produce at its outputs (cable 708) the low order $m$-bits of the product (in binary form) of the numbers stored in registers 701 and 702. In like fashion, an adder 709 is arranged to receive the $m$-bit number presented on cable 708 as well as the $m$-bit number stored in register 703. The adder output, which ignores any carry out of the high order bit, is coupled via cable 710 to the inputs of AND gates 706-0 through 706-15.

At the end of the multiplicative and additive operations described above, a new $m$-bit integer will appear at the input to register 701; the next pulse on the CYCLE line will cause this integer to be substituted in place of the previously stored value, and also appear on the output lines labeled ROUT. Each CYCLE pulse thereafter will cause the generation of yet another $m$-bit number on the ROUT lines.

It can be shown mathematically and observed empirically that the sequence of numbers generated using the foregoing procedure resemble randomly chosen $m$-bit integers; the bit patterns do not appear to follow any sensible sequence of values. However, the process is reproducible (i.e., for the same input value and the same number of cycles, the same output will appear) and the output sequence for a given input value will always be the same. The repetition period, for appropriately chosen values of constants stored in registers 702 and 703, will be very long, typically thousands of cycles.

Figure 8:
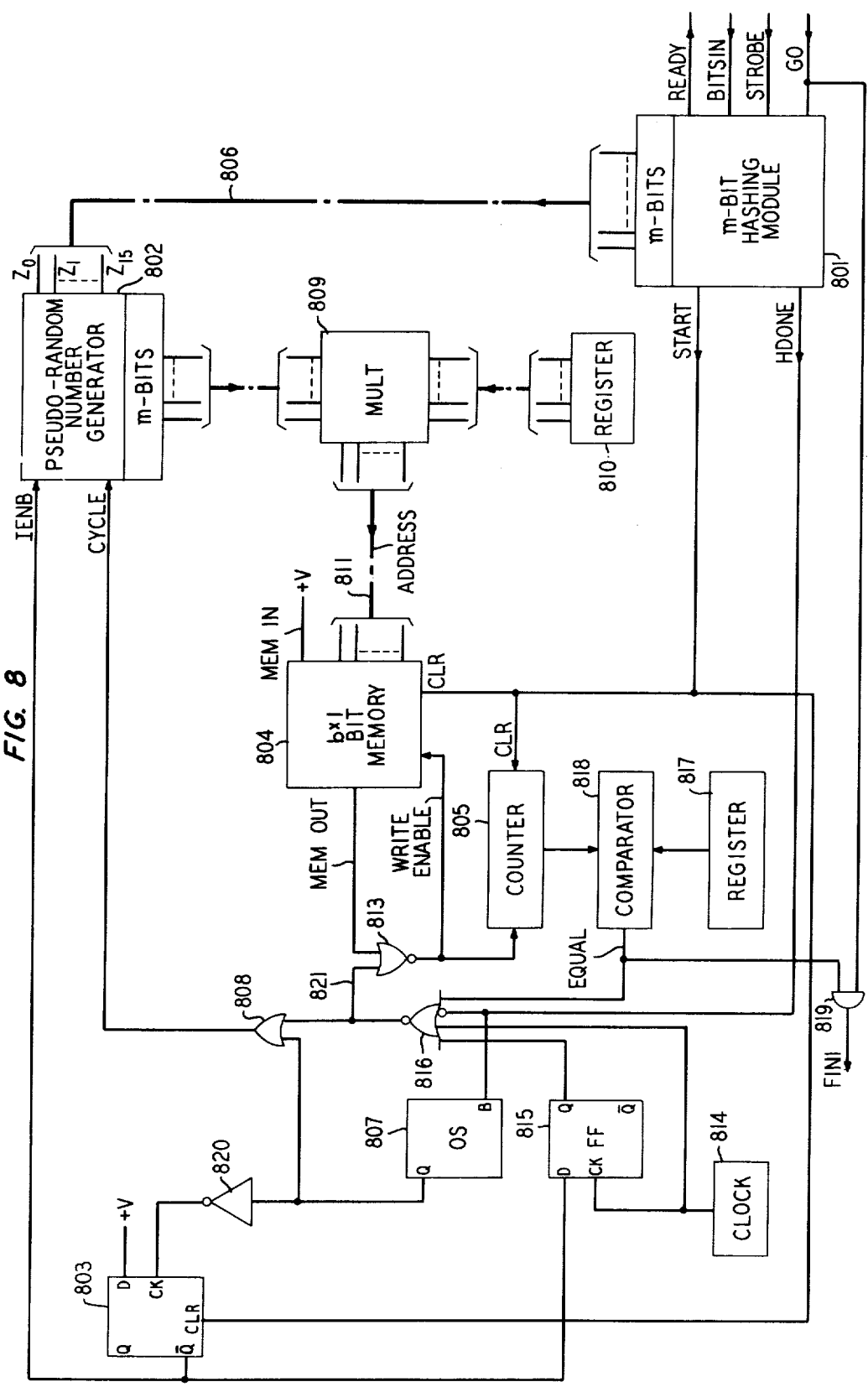
FIG. 8 is an overall block diagram of a code word generator constructed in accordance with the present invention.
Figure 9:
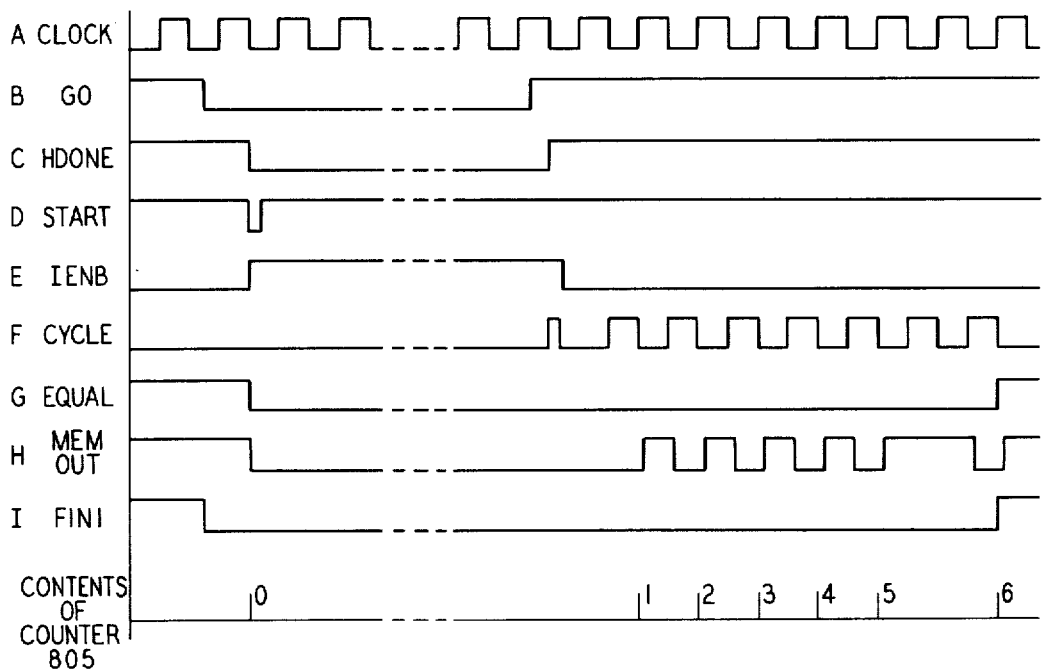
FIG. 9 is a timing diagram for the circuit of FIG. 8.

The remaining steps (steps C and D) in the formation of individual codes is performed using the circuitry shown in block diagram form in FIG. 8; a timing diagram for the circuit is shown in FIG. 9. Briefly stated, this circuitry uses the sequence of $m$-bit pseudo-random numbers output from the circuit of FIG. 7 to generate a width $b$ weight K individual code by first scaling the numbers to the range between 0 and $b$ and then using the scaled numbers to determine the positions of the K bits within the individual code word. Here again, it is desired that a given $m$-bit input sequence produce the same output code, so that the process is reproducible; in addition, it is desired that the positions of the K ONES in the output string of $b$ bits appear to be random. In FIG. 8, the mapping circuit of FIG. 5 is combined and shown as block 801; the pseudo-random sequence generator of FIG. 7 is shown as block 802.

Recalling the previous discussion, when circuit 801 begins its operation, a short pulse is generated on the line labeled START (see FIG. 9, waveform D). This pulse is used to clear a memory 804 and a counter 805, the functions of which will be described hereinafter. In addition, a flip-flop 803 is cleared, so that its $\bar{Q}$ output, which is connected to the IENB input of circuit 802, goes high. The $m$-bit code generated by circuit 801 is coupled to the $Z_0$-$Z_{15}$ inputs of circuit 802 via cable 806; when circuit 801 has completed its processing, the HDONE lead (waveform C) will go high, triggering a one-shot 807 to pass a pulse through OR gate 808 to the CYCLE input to circuit 802 (waveform F). Now, the $m$-bit output of circuit 801 is contained in circuit 802, and flip-flop 803 is toggled on the trailing edge of the one-shot output by virtue of inverter 820 so that IENB thereafter remains low (see waveform E).

The $m$-bit output generated by circuit 802 is coupled to one set of inputs of a digital multiplier 809, which receives its other inputs from a static register 810 which contains the number "$b$" stored therein in binary form. Multiplier 809 is arranged to discard the low order $m$-bits of the product that it forms, and to retain only the high order $\log_2 b$ bits. This assures that the output of the multiplier on lines 811 will be in the range between 0 and b-1. (Stated differently, the $m$-bit output of circuit 802 is regarded as having a binary point exactly to the left of the $m$ binary bits; only the integer part of the product is retained.)

In order to accumulate the first K different numbers output from multiplier 809, line 811 is connected to the address input of a $b \times 1$ bit memory 804. The memory is arranged so that the bit addressed appears on the output wire labeled MEMOUT (see waveform H for an example): if this bit is a zero, a high is passed through OR gate 813 each time the signal on line 821 goes low, incrementing counter 805 and changing the addressed bit to a one. (This occurs because the line labeled WRITE ENABLE is made high, reading in the high signal permanently applied to the line labeled MEMIN.) On the other hand, if the bit addressed was a one, the output of OR gate 813 is low, and counter 805 does not increment.

The remaining numbers in the output code are generated in a similar manner, under the control of a clock 814, which provides a low on the Q output of a flip-flop 815 when IENB is low; succeeding transitions generated by clock 814 are passed through a NOR gate 816, thereby providing the succeeding highs needed to generate CYCLE pulses for circuit 802 and the lows needed to enable NOR gate 813 to advance counter 805. When the count in counter 805 reaches the number K stored in a register 817, the output of a comparator 818 will generate a high signal on its output labeled EQUAL (see waveform G). This high closes gate 816, disabling further CYCLE pulses from reaching circuit 802. Concurrently, AND gate 819 is made to go high, signaling the end of the code generation process with a signal labeled FINI (see waveform I). At this time, the process of generating the individual code is complete: a width $b$, weight K code is stored within memory 804.

Figure 10:
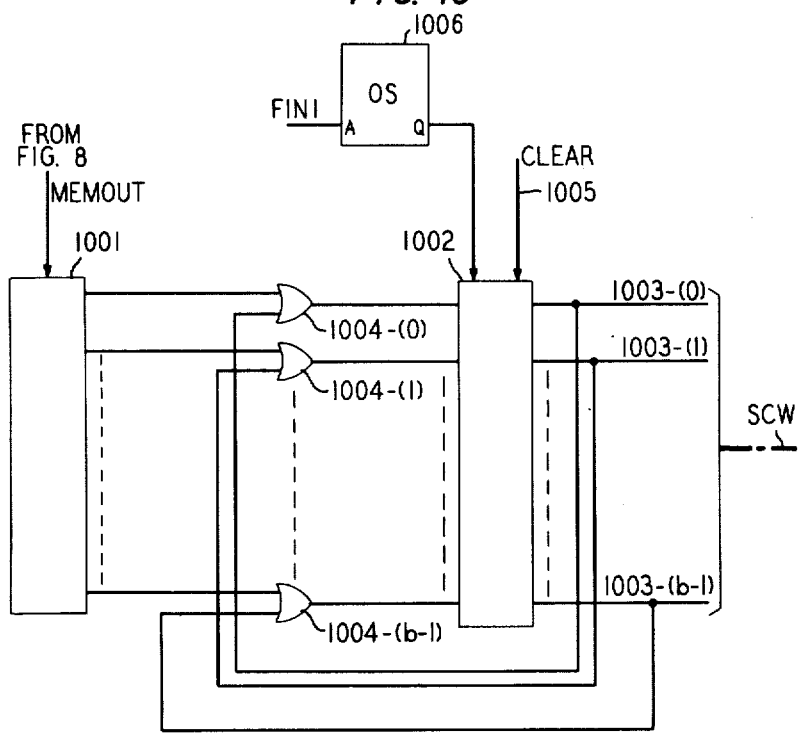
FIG. 10 is a block diagram of apparatus used to combine individual code words formed by the circuit of FIG. 8 into superimposed code words.

The individual code may be read out from memory 804 simply by applying a sequence of addresses from 0 to b-1 on line 811, and by connecting the MEMOUT line to a suitable register, such as $b$ bit register 1001 of FIG. 10.

A superimposed code word (or a query) may be formed for a record simply by logically OR'ing together several individual codes; the apparatus shown in FIG. 10 may be used for this purpose. A second register 1002 also capable of storing a $b$ bit word includes $b$ output lines 1003–(0) through 1003–(b−1) which are coupled to first inputs of a series of OR gates 1004–(0) through 1004–(b−1). The remaining inputs to the OR gates are coupled to the outputs of register 1001. Initially, register 1002 is cleared by application of a pulse on line 1005. When an individual code has been entered in register 1001, the FINI output from FIG. 8 is used to trigger a one-shot 1006, which cycles register 1002: the present contents of the register are then replaced by a new $b$ bit word which is formed by logically OR'ing the old register contents with the contents of register 1001. As new individual codes are generated, they are entered in register 1001, and the process is repeated.

A graphic example of the assignment of individual codes to attribute values, and the combination of the individual codes to form SCW's will be instructive. In this example, it is assumed that the codes are 48 bits wide ($b = 48$), and that the individual code weight is 4 ($K = 4$). In the following Table, some of the attribute values for record 9 of FIG. 1 have been listed; next to each attribute value is a series of four integers, which represent the locations of the ONES in individual codes which might have been formed for these values. Of course, the integer values listed are only exemplary, and other attribute values such as "GAS," "CAR," et cetera could have been used as well.

TABLE 4

| ATTRIBUTE VALUE | WIDTH 48 WEIGHT 4 INDIVIDUAL CODE LOCATION OF ONES | | | |
|---|---|---|---|---|
| RODS | 16 | 17 | 43 | 44 |
| GULF | 0 | 3 | 16 | 39 |
| STATION | 7 | 13 | 14 | 25 |
| 410 | 4 | 5 | 12 | 17 |
| MONTAUK | 19 | 22 | 28 | 39 |
| HWY | 4 | 27 | 35 | 43 |
| W | 29 | 31 | 40 | 43 |
| ISLIP | 7 | 27 | 28 | 34 |

Referring to FIG. 11a, a rectangular area 1101 is divided into 48 segments or positions indicated by rulings 0 to 47. Each position corresponds to a particular bit in the word being generated, and may include a mark or a space. In FIG. 11b, the positions corresponding to the individual code for the attribute value "RODS" have been marked; in FIG. 11c, additional marks have been added for the attribute values "GULF" and "STATION." It is to be noted here that the resulting code includes 11 (not 12) marks, since the codes for "RODS" and "GULF" overlap at position 16. When marks representing all of the ONES in the individual codes listed in Table 4 have been processed in the circuitry of FIG. 10, the resulting SCW is illustrated graphically in FIG. 11d. Here, the 4-bit individual codes for each of the eight attribute values have been combined or superimposed so that the SCW for the record consists of a total of 23 marks in the 48 bit positions.

The foregoing example illustrates that as the number $r_i$ of attribute values per record increases, the density of marks in the SCW also increases, but not in a strictly linear relation, due to superimposition in certain bit positions. Experimentally, it has been found that a bit density of approximately 50 percent is ideal for the SCW's. Statistically, this density corresponds to a 70 percent ratio between the total number of ONES in all individual codes for a record and the word width $b$. Since a particular average value for $r_i$ is usually known in advance, and a value for $b$ is set by the circuit arrangement used, the value of K may be set in accordance with the relationship:

$$K \approx 0.70b/i_i$$

Thus, if records having an average of eight attribute values are in the collection, and if a word length of 148 bits is chosen, that $K \approx 0.70(148)/8 \approx 13$ is a reasonable choice. However, it is also to be noted that $K$ need not be constant for all attribute values: instead, smaller values of $K$ are preferable where the attribute value occurs frequently in the collection, while larger values are permissible for rare values. Discrimination between different attribute values on the basis of frequency of occurrence may be accomplished with additional logic circuitry which utilizes state of the art techniques.

4. Searching Module a. Introduction

Returning to the previous example, if it is desired to determine which of the records in the collection of FIG. 1 includes the attribute values "GULF" and "MONTAUK," a query mask is generated using the same techniques described above. Since the code generation technique is reproducible, the query would be shown in FIG. 11e, i.e., seven marks positioned in bit locations 0, 3, 16, 19, 22, 28 and 39. Visual inspection of the records of FIG. 1 reveals that the correct answer to the query is record 9 alone, since it includes the desired attribute values. A brief general description of the mechanics of making this selection via superimposed coding will be instructive.

Figure 12:
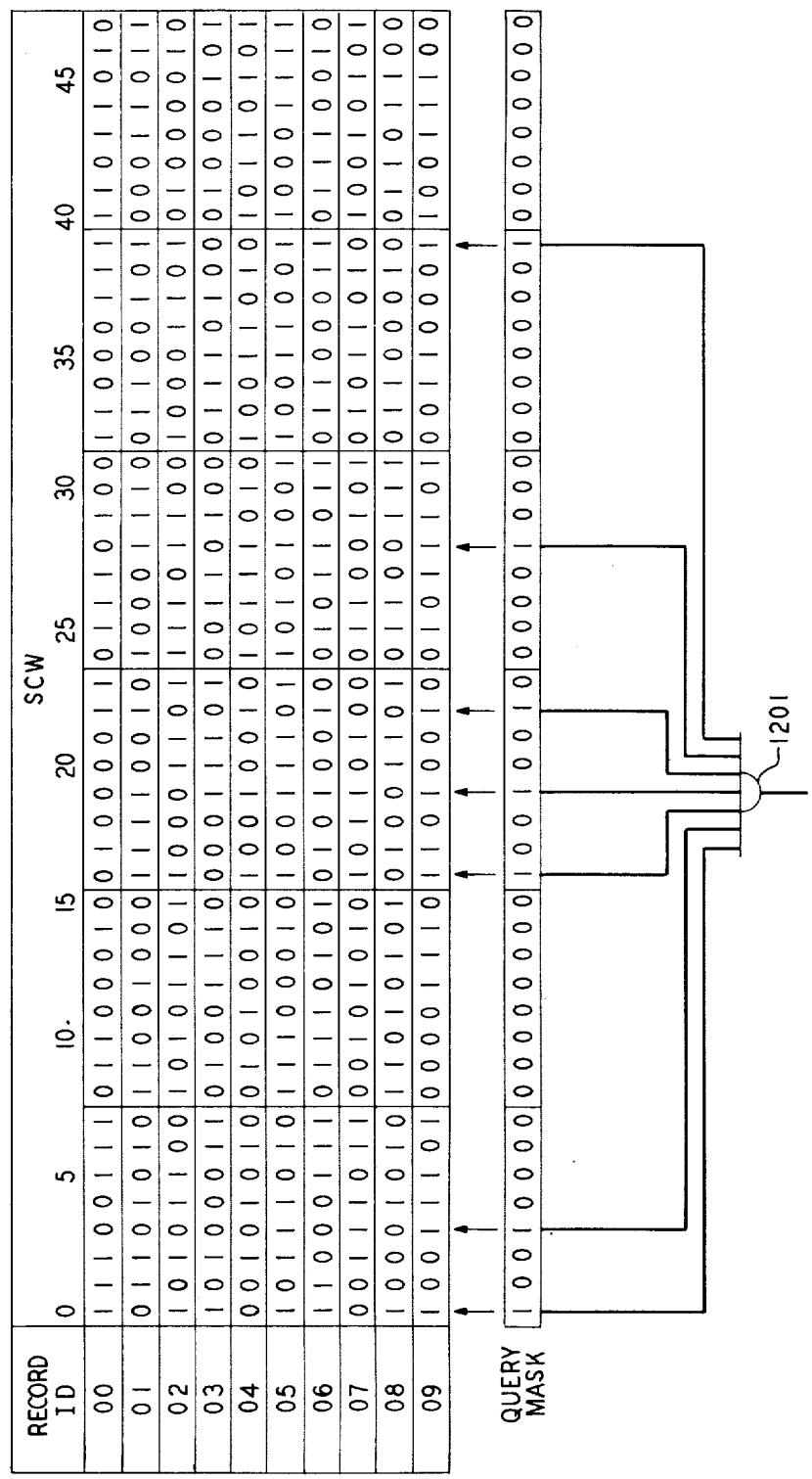
FIG. 12 is a graphic representation of the AND'ing process by which it may be determined if a superimposed code word satisfies a query mask.

In FIG. 12, 48 bit SCW's have been listed for each of the records 0 through 9 in the collection of FIG. 1; the SCW for record 9 is the same as is shown in FIG. 11d, while the remaining code words have been generated arbitrarily, for the purpose of illustration. The query mask of FIG. 11e is also redrawn in FIG. 12.

The SCW file and the query mask are constructed in accordance with the theory of superimposed coding, so that if a SCW does not contain "ONES" in all bit positions singled out by the "ONES" in the query mask, then the corresponding record cannot possibly satisfy the match specification. On the other hand, if the ONES in the query mask are matched by the SCW, then the record identified may contain the desired attribute values. Stated differently, the query mask matching requirement is a necessary but not a sufficient condition for a record to satisfy the match specification. Some records which are preselected by logic 301 of FIG. 3 will not actually possess the attribute values of interest, but will be "false drops". These records will be detected by comparator 201 of FIG. 3, and then discarded; the number of false drops that are expected is a function of the values chosen for "$b$" and "$K$", and may be made suitably small.

Returning to the example of FIG. 12, the SCW's for records 5 and 9 both satisfy the requirement that they have ONES in all bit positions signaled by ONES in the query mask; record 5 is a false drop, since the record does not contain the desired attribute values (see FIG. 1), while record 9 is a true drop, since it does have the values sought. Records 0–4 and 6–8 will not be selected by logic 301, since they have SCW's which do not contain "ONES" in all of the locations in which the query mask has "ONES."

The bit matching technique described above can be performed quite readily by special purpose hardware which is described in detail hereinafter. Basically, as shown in FIG. 12, this hardware could include an AND gate 1201 arranged to monitor only the bit positions signaled by "ONES" in the query mask; these bit locations for each SCW are examined in turn, and only when the output of gate 1201 goes high is there a match. This technique does not require accessing of all of the bN bits stored in a memory which contains SCW's for N records. Rather, the accessing is limited to only those locations which are called for in the query mask. Obviously, since the SCW's could be stored in many different types of memory devices, such as charge coupled devices, magnetic bubble devices or delay lines, searching techniques different from the one described below could be employed.

b. Detailed Description of Searching Module 403 of FIG. 4

Figure 14:
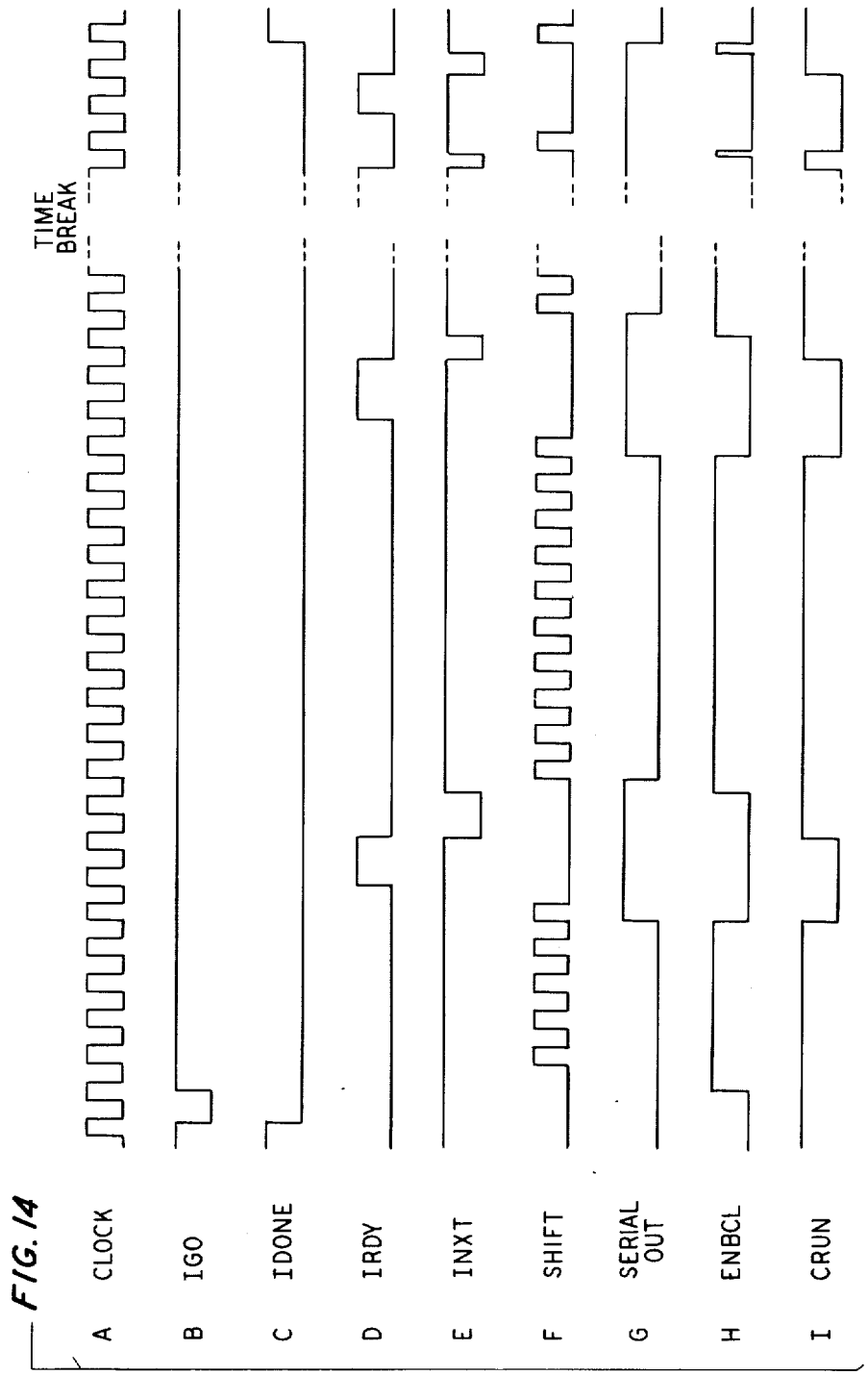
FIG. 14 is a timing diagram for the circuit of FIG. 13.
Figure 15:
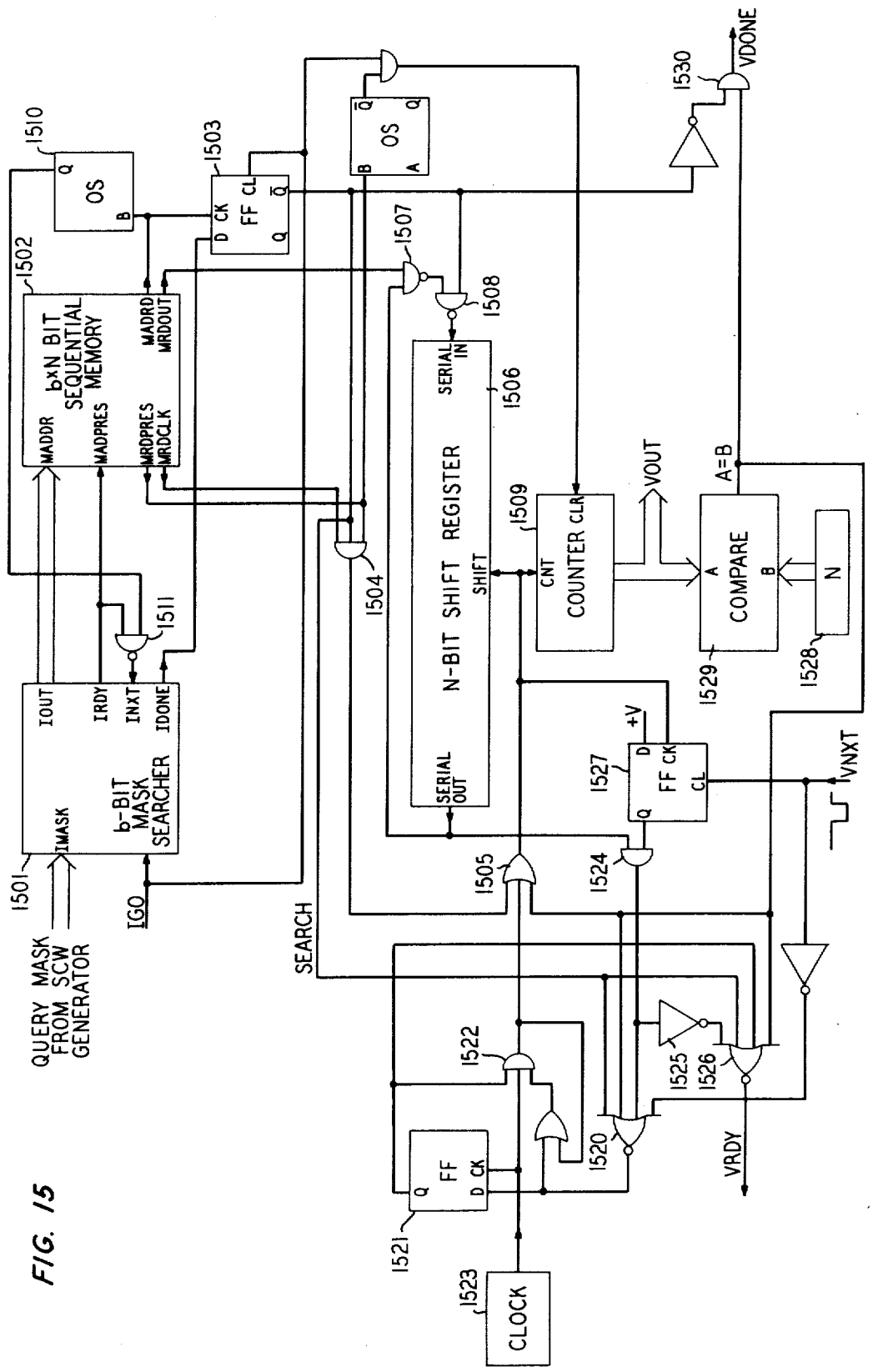
FIG. 15 is an overall block diagram of a superimposed code word searching module constructed in accordance with the present invention.

An overall block diagram of a superimposed code word searching module constructed in accordance with the principles of the present invention is shown in FIG. 15; a timing diagram for the module is shown in FIG. 16. The module includes a $b$ bit mask searcher 1501, which itself is shown in block diagram form in FIG. 13; the timing diagram accompanying this drawing is shown in FIG. 14.

As stated previously, the function of the apparatus of FIG. 15 is to find matches to a given query mask in a file of SCW's, which may be stored in a sequential access memory 1502 which corresponds to auxiliary store 402 of FIG. 4. This circuit is advantageous, in part, because it can operate with a sequential memory, such as a delay line, a bubble memory, or other similar devices, rather than a parallel access memory: the latter would undoubtedly operate faster, but the former is less expensive and more readily available. Obviously, some degree of parallelism could be attained even with sequential memories, as by running several at the same time.

Basically, memory 1502 is arranged so that the N SCW's stored therein can be serially read out by bit position. For example, if bit position 0 is input on the line labeled MADDR, then an N bit binary sequence is read out on the line labeled MRDOUT; the sequence includes the 0'th bit of each of the N SCW's stored in the memory. Similarly, if bit position 1 is input on MADDR, then the 1st bit of each SCW is sequentially presented on MRDOUT. Timing control into and out of memory 1302 is achieved by the lines labeled MADPRES, MRDPRES, MADRD and MRDCLK, as follows: the presence of a valid address, i.e., a value in the range between 0 and $b-1$, on line MADDR is signaled by raising MADPRES to a high state. The memory is arranged to read the data on MADDR only at specific times determined by the internal condition of the memory devices. When this time to accept a new address occurs, a positive going pulse appears on the MADRD line, causing the address to be read, provided MADPRES is high. After the address has been read, MADRD goes back to a low state. When the first bit of output data becomes available on line MRDOUT, the line MRDPRES goes high, and stays high until all N bits have been read. A clock output on line MRDCLK is synchronized with the data output on MRDOUT.

Figure 13:
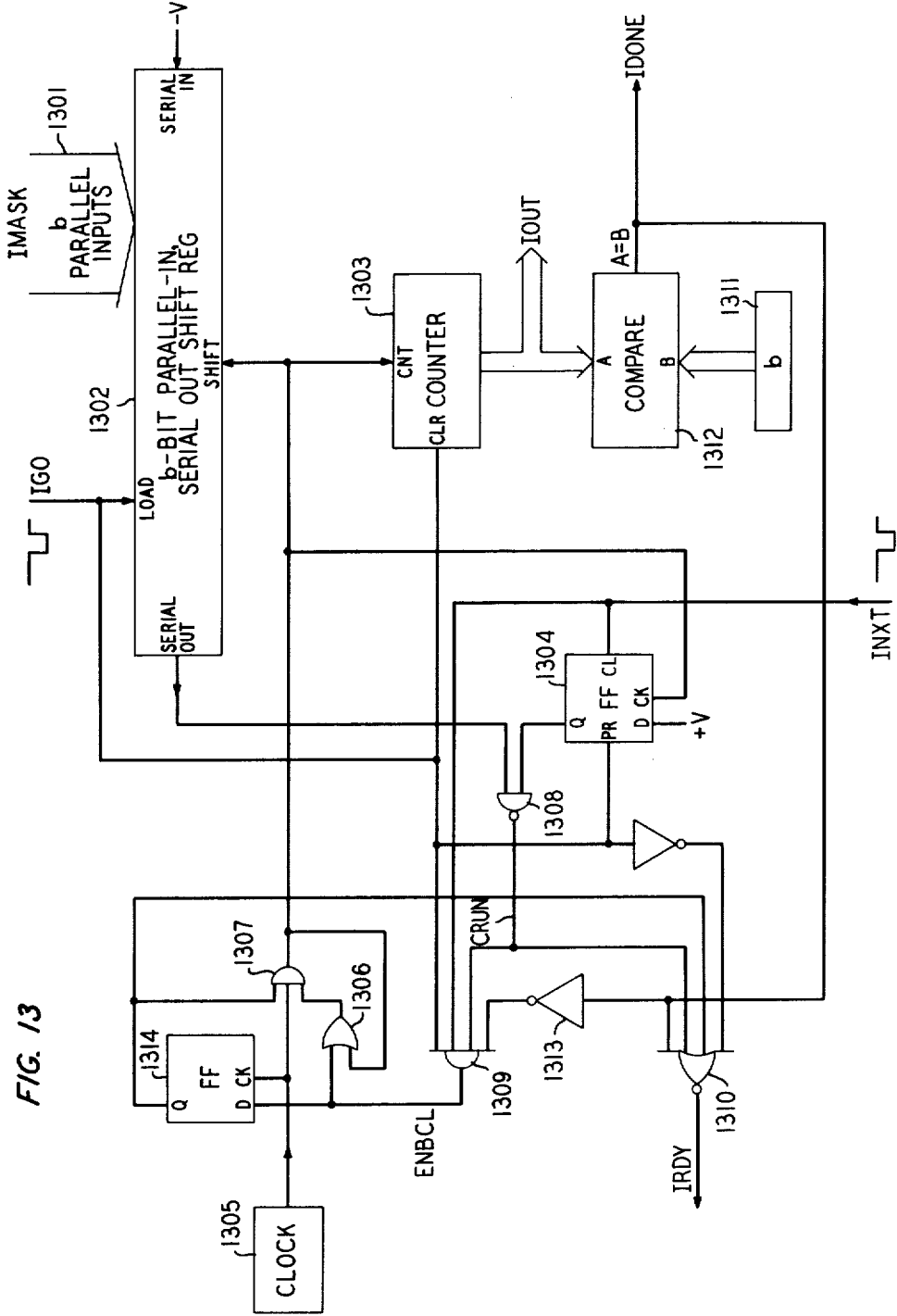
FIG. 13 is a block diagram of a $b$-bit mask searcher constructed in accordance with the present invention.

The purpose of the mask searcher of FIG. 13 is to accept a $b$ bit input representing the query mask on the $b$ lines collectively labeled 1301, and to generate therefrom a sequence of binary numbers which represent the locations of the "ONES" in this query mask. Operation begins when a negative going pulse is applied on the line labeled IGO (see FIG. 14, waveform B), causing the query mask value to be loaded into a $b$ bit parallel-in, serial-out shift register 1302, causing a counter 1303 to be cleared, and causing a flip-flop 1304 to be preset to provide a high Q output. If the signal on the ENBCL input to OR gate 1306 is high, timing pulses generated by a clock 1305 (see FIG. 16, waveform A) will be passed through AND gate 1307 and used both to advance the count in counter 1303 and to shift the contents of register 1302. The shift waveform is shown in FIG. 14, waveform F. The serial output from register 1302 is applied to one input of a NAND gate 1308, the other input of which is supplied from the Q output of flip-flop 1304: as long as the output of register 1302 is low (i.e., all zeroes), the CRUN output of gate 1308 remains high (see waveform I), keeping the ENBCL output of AND gate 1309 high (see waveform H).

When a "ONE" is output from register 1302 (see waveform G), the CRUN signal goes low, bringing ENBCL low. When the output of clock 1305 next goes low, the Q output of a flip-flop 1314 follows, thereby closing gate 1307. At this time, the count in counter 1303, which is output on lines IOUT, represents the position of the ONE bit in the query mask that has been detected. Concurrently, the IRDY output of NOR gate 1310 goes high (see waveform D), indicating to the circuitry of FIG. 15 that its processing may begin.

The above situation remains static until external processing has been completed, at which time a negative going pulse is applied on the INXT input line (see waveform E). This clears flip-flop 1304 and again renders CRUN high, so that operation as aforedescribed may continue. When the entire $b$ bit word within register 1302 has been processed, the count in counter 1303 will match the fixed output of a static register 1311 which stores the value $b$ in binary form. At this point, the IDONE output (see waveform C) of a comparator 1312 goes high, closing AND gate 1309 via inverter 1313. Both IRDY and ENBCL thereafter remain low, until a new query mask is to be processed.

Turning now to FIGS. 15 and 16, the circuitry used to perform searches through the stored SCW's to determine which of them satisfy a given match specification is shown in block diagram form. In this figure, the $b$ bit mask searcher of FIG. 13 is labeled 1501, and the previously described $b \times N$ bit sequential memory which corresponds to auxiliary store 402 of FIG. 4 is labeled 1502.

The basic procedure followed by the circuit of FIG. 15 is (1) reading out a string of N bits for each bit position flagged by a ONE in the query mask, (2) logically AND'ing the first bit string with a string of ONES, on a bit-by-bit basis, and (3) logically AND'ing each further string with the result of the previous AND'ing, so that, when completed, an N bit word will be formed in which the location of a ONE bit represents the ID of a record which satifies the query mask. This general procedure will be illustrated in the example of FIGS. 17 and 18.

In FIG. 17, 10-bit SCW's having ID's 00 through 09 are shown, together with a 10-bit query mask. The mask has ONES in positions 01, 03, 06 and 07, which are the only positions of interest, since the goal of the apparatus of FIG. 15 is to find out which SCW's have ONES in all bit positions signaled by ONES in the query mask.

In FIG. 18(a), the data from bit position 01 of each SCW is logically AND'ed with a string of ONE bits using a series of AND gates 1800–1809. The result (which is the same as the data from bit position 01) is used as one set of inputs in FIG. 18(b); the other set of inputs is the data from bit position 03 of each SCW, and the result of the AND'ing is used in FIG. 18(c). The foregoing process is repeated for each bit string signaled by a ONE in the query mask, namely, for positions 06 and 07. These results are shown in FIGS. 18(c) and (d). After the final AND'ing, as shown in FIG. 18(d), the presence of a ONE bit indicates that the query mask has been satisfied; the position of the ONE bit indicates the ID of the record which matches. In this example, matches are indicated by ONES in positions 03 and 07. Visual inspection confirms that SCW's with these ID's do indeed have ONES in positions 01, 03, 06 and 07, as desired. In FIG. 18, the use of AND gates 1800–1809 is only exemplary. The following discussion reveals that a single gate (NAND gate 1507 in FIG. 15) performs the same function on a serial basis.

Returning now to FIGS. 15 and 16, it is initially to be noted that operation is divided into two phases, i.e., searching and readout. In the search phase, operation begins by placing a negative going pulse on the IGO line (see waveform A of FIG. 16). This clears a flip-flop 1503, and allows mask searcher 1501 to begin processing the query code applied on the IMASK lines. When searcher 1501 has found the first ONE in the mask and converted it to a binary number, the number appears on the IOUT leads, which are connected directly to the MADDR inputs of sequential memory 1502. Concurrently, the IRDY output of searcher 1501 goes high (see waveform G), and this signal is coupled to the MADPRES input of memory 1502.

When memory 1502 is ready to begin reading out the data contained in the selected bit location, the MRDPRES line goes high (see waveform C) so that clock pulses from the MRDCLK output of the memory can pass through an AND gate 1504 and an OR gate 1505 to the shift input of an N-bit shift register 1506. This shift register is initially loaded with all ONES, for reasons explained previously; at each pulse on the MRDCLK line, the bit output from register 1506 is AND'ed with the bit output on the MRDOUT line, in NAND gate 1507, and the resultant bit is reapplied to the shift register via NAND gate 1508. (It is to be noted here that since both gates 1507 and 1508 are NOR gates, inversion of the data polarity is cancelled; also, gates 1508 and 1504 are held open by the high Q̄ output of flip-flop 1503.)

The above process continues until all of the bits in the chosen string have been AND'ed with the contents of register 1506, and the results reentered in the register. At this point, a pulse on the MADRD output of memory 1502 (see waveform B) produces a pulse at the output of a one-shot 1510, which is passed through a NOR gate 1511 to the INXT input of searcher 1501 (see waveform I). Since the IDONE output of searcher 1501 is low, the MADRD output of memory 1502 does not change the state of flip-flop 1503; accordingly, the location of the next ONE in the query mask is transferred from searcher 1501 to memory 1502, and the data in the selected bit string is again AND'ed with the contents of register 1506.

When the location of all of the ONES in the query mask have been output from searcher 1501, its IDONE output goes high (see waveform H). The next clock output to flip-flop 1503 causes its Q̄ output to go low, disabling AND gate 1504. The search cycle of the circuit of FIG. 15 is now complete, and register 1506 now contains ONES in bit positions corresponding to the ID's of selected records.

The read-out phase of the cycle is now ready to begin. This phase is carried out in a manner nearly identical to that used in mask searcher 1501. Initially, when the Q̄ output of flip-flop 1503 goes low, the output of NOR gate 1520 goes high. This, in turn, causes the Q output of flip-flop 1521 to go high, so that AND gate 1522 is permitted to pass timing pulses generated by a clock 1523. At the occurrence of each clock pulse, a shift signal is delivered to register 1506 and the count in counter 1509 is incremented by one. The input to register 1506 is a ONE, since one input of NOR gate 1508 is tied to the low Q̄ output of flip-flop 1503; the output of register 1506 is applied to an AND gate 1524. As long as the output of the shift register 1506 continues to be ZEROES, operation in this fashion continues.

When a ONE is output from shift register 1506, the output of gate 1524 goes high: this makes the output of inverter 1525 low, and the output of NOR gate 1526 high, providing a high VRDY signal (see waveform E). At this time, the count in counter 1509, as provided on the lines labeled VOUT, represents the ID of the record which satisfies the match specification.

Operation is resumed by application from an external source of a negative going pulse on the line labeled VNXT (see waveform F). This brings the Q output of flip-flop 1527 low, again raising the output of NOR gate 1520 and again passing clock pulses through gates 1522 and 1505 to shift register 1506 and increment counter 1509.

After the entire N-bit word has been read from register 1506, the count in counter 1509 will equal the value N stored in static register 1528. Accordingly, the output of a comparator 1529 will go high, raising the VDONE output (see waveform D) of gate 1530 to indicate completion of the read-out phase.

With respect to the preceding circuit descriptions, it is to be clearly understood that numerous changes and modifications may be made by those skilled in the art without departing from the spirit and scope of the present invention. Accordingly, it is intended that the invention be limited only by the appended claims.

It is also to be noted that associative retrieval (sometimes referred to as partial match retrieval), using the technique of superimposed coding as described hereinabove, may sometimes be viewed as enabling the elimination of undesired records (i.e., those that do not satisfy a match specification) rather than enabling the selection of desired records. Such elimination is desirable, since the eliminated records, which hopefully form the great majority of the collection, do not have to be searched linearly. Rather, only the few remaining non-eliminated records need be checked to separate the false drops from the true matches. In the technique described hereinabove, elimination occurs when it is determined if a superimposed code word contains ONES in all bit positions in which the query code has ONES. If not, the record associated with that code word is eliminated, since it cannot have the desired attribute values included in the query code; if there is a match, then the record may contain the sought after properties, and further linear searching is required.

What is claimed is:

1. Apparatus for generating a binary superimposed code word representative of a record containing units of information from which one or more attribute values may be derived, comprising:
    means for assigning a unique intermediate code to each of said attribute values;
    means for converting each of said intermediate codes to a corresponding binary code word having a total of $b$ bits of which exactly K bits are ONES; and
    means for combining said binary code words to form said superimposed code word,
    wherein said converting means includes:
    (a) means for mapping said intermediate code word into an integer value lying within a predefined range;
    (b) means for generating a particular sequence of pseudo-random numbers in response to said integer value;
    (c) means for scaling each of said pseudo-random numbers in said sequence to a value between 0 and b-1; and
    (d) means responsive to the value of said scaled numbers for determining the positions of said K bits within said binary code word.

2. The invention defined in claim 1 wherein said combining means is arranged to logically OR said binary words together on a bit-by-bit basis.

3. The invention defined in claim 2 wherein said mapping means includes a hashing circuit adapted to convert an input word having a variable length to an output word having a predetermined length.

4. The invention defined in claim 3 wherein said sequence generating means is arranged to produce an output sequence for $i = 1,2,3,\ldots$ given by $$Z_i = [(A \times Z_{i-1}) + C]_{modulo\ M,}$$

wherein $A$ and $C$ are constants and $Z_0$ is said integer value.

5. Apparatus for associatively searching a collection of records to identify those records having desired characteristics, comprising:
    means for assigning a binary code word to each of said records based upon each of its individual characteristics;
    means for storing said binary code words in an auxiliary file;
    means for generating a binary query code based upon said desired characteristics; and
    means for determining which of said binary code words in said file logically include said binary query code,
    wherein said assigning means includes means for forming a width $b$ weight K code word for each of said individual characteristics of a record and means for combining said width $b$ weight K code words by logically OR'ing them together on a bit-by-bit basis.

6. Apparatus defined in claim 5 wherein said determining means includes means for AND'ing together particular bits of each of said code words, said particular bits being determined by said query code.

7. Apparatus defined in claim 5 wherein said forming means includes:
    (a) means for numerically representing each of said individual characteristics as a variable bit binary number;
    (b) means for converting said variable bit binary number to a fixed bit binary number via hash coding;
    (c) means for generating a sequence of pseudo-random numbers in response to said fixed bit binary number;
    (d) means for scaling said pseudo-random numbers into the range between 0 and b-1; and
    (e) means for selecting K of said $b$ bits in response to said scaled numbers.

8. Apparatus for forming a binary superimposed code word for a record containing alphanumeric units of information, comprising:
    a generator circuit for forming a width $b$, weight K code word for each of said units of information;
    a register for storing a $b$ bit binary word;
    means operable for logically OR'ing the contents of said register with one of said code words on a bit-by-bit basis and for storing the resulting word in said register; and
    means for sequentially operating said OR'ing means in response to the generation of each of said code words.

9. The invention defined in claim 8 wherein said generator circuit includes:
    (a) a hash coder for transforming alphanumeric units of information to an m-bit binary code;
    (b) a pseudo-random number generator for generating a particular number sequence in response to the value of said m-bit binary code; and
    (c) a memory circuit for storing the first K different numbers in said number sequence.

10. The invention defined in claim 9 wherein said pseudo-random number generator is arranged to produce a sequence given by $$Z_1 = [(A \cdot Z_{i-1}) + C]_{modulo\ M,}$$

where A and C are constants, $i = 1,2,3,\ldots$ and $Z_0$ is said m-bit code.

11. Apparatus for selecting records having desired attribute values from a collection of N records, each having a plurality of attribute values, comprising:
    means for (a) assigning a $b$ bit binary superimposed code word to each of said N records, each of said superimposed code words being formed by combining individual $b$ bit binary code words each representing one of said attribute values, and (b) assigning a $b$ bit binary query code word to said desired attribute values, said query code word being formed by combining individual $b$ bit binary code words each representing one of said desired attribute values;
    means for storing said N $b$ bit superimposed code words; and
    means for examining portions of each of said N stored $b$ bit superimposed code words to select said records, said portions being determined by said query code.

12. The invention defined in claim 11 wherein said assigning means is arranged to generate a sequence of pseudo-random numbers for each of said attribute values, and wherein said individual $b$ bit binary code words include $(b - K)$ ZEROES and K ONES, said ONES being in locations determined by the first K different numbers in said sequence.

13. The invention defined in claim 12 wherein said assigning means is arranged to combine said individual codes by locating a ONE in any location in which said individual codes have a ONE.

14. The invention defined in claim 13 wherein said examining means is arranged to logically AND together data in bit locations of superimposed code words determined by the bit locations of ONES in said query code.

15. The invention defined in claim 13 wherein said storing means includes a sequential access memory arranged to provide a readout of data from particular bit locations of each of said N stored superimposed code words; and wherein said particular bit locations are determined by the bit locations of ONES in said query code.

16. Apparatus for retrieving particular records having desired attributes from a collection of records, comprising:

means for generating, for each record in said collection, a binary superimposed code word representative of the attributes of said record, said means including
(a) means for forming an individual $b$-bit code word having ONES in K locations thereof for each attribute of said record; and
(b) means for combining said individual words into said superimposed code word by logically OR'ing said individual words together on a bit-by-bit basis;

means for storing said superimposed code words;
means including said last-mentioned generating means for forming a binary query code word representative of said desired attributes; and
means for determining which of said records have corresponding stored superimposed code words with ONES in all bit locations in which said query code has ONES.

17. The invention defined in claim 16 wherein said forming means includes:
(a) means for assigning a numerical value to each of said attributes;
(b) means for converting said numerical value to a hash value having a fixed number of binary bits;
(c) means for generating a particular sequence of numbers in response to said hash value; and
(d) means for assigning said K locations in response to the first K different numbers in said sequence.

18. A method of selecting desired records from a collection based upon a specification of desired attribute values of said records, including the steps of:
(a) generating an individual binary code word having K ONES and $b$-K ZEROES for each attribute value of each record, the location of said K ONES being determined on a pseudo-random, reproducible basis;
(b) combining said individual code words to form a superimposed code word for each of said records, said superimposed code word having ONES in all locations in which said individual codes have ONES and ZEROES in remaining locations;
(c) storing said superimposed code words in a memory;
(d) generating a binary query code word representing said desired attribute values using steps (a) and (b) above; and
(e) examining selected portions of said stored superimposed code words to select said desired records, said selected portions being determined by the positions of ONES in said query code word.

19. The method of claim 18 wherein said first generating step includes:
(a) assigning a numerical value to each of said attribute values,
(b) converting said numerical value to a hash value having a fixed number of bits,
(c) forming a sequence of pseudo-random numbers in response to said hash value, and
(d) determining the location of said ONES in response to the first K different numbers in said sequence.

20. The method of claim 19 wherein said combining step includes:
(a) entering the first of said individual code words in a $b$-bit register,
(b) OR'ing the contents of said register with the next one of said individual code words, on a bit-by-bit basis,
(c) storing the resulting $b$-bit code word in said register, and
(d) repeating steps $(b)$ and $(c)$ for each remaining one of said individual code words.

21. A method of generating a binary superimposed code word representative of a record containing units of information from which one or more attribute values may be derived, comprising the steps of
assigning a unique intermediate code to each of said attribute values;
converting each of said intermediate codes to a corresponding binary code word having a total of $b$ bits of which exactly K bits are ONES; and
combining said binary code words to form said superimposed code word,
wherein said converting step includes:
(a) mapping said intermediate code word into an integer value lying within a predefined range;
(b) generating a particular sequence of pseudo-random numbers in response to said integer value;
(c) scaling each of said pseudo-random numbers in said sequence to a value between 0 and $b-1$; and
(d) determining the positions of said K bits within said superimposed code word in response to the first K different scaled numbers.

22. The method defined in claim 21 wherein said combining step includes logically OR'ing said binary words together on a bit-by-bit basis.

23. The method defined in claim 22 wherein said mapping step includes converting an input word having a variable length to an output word having a predetermined length via a hashing process.

24. The method defined in claim 23 wherein said sequence generating step includes generating an output sequence for $i = 1,2,3, \ldots$ given by $$Z_i = [(A \times Z_{i-1}) + C]_{modulo\ M},$$

wherein $A$ and $C$ are constants and $Z_0$ is said integer value.

* * * * *

UNITED STATES PATENT AND TRADEMARK OFFICE
CERTIFICATE OF CORRECTION

PATENT NO. : 4,118,788
DATED : October 3, 1978
INVENTOR(S) : Charles S. Roberts

It is certified that error appears in the above-identified patent and that said Letters Patent are hereby corrected as shown below:

Column 1, line 28, "known" should read --know--.
Column 3, line 3, "OR'$\lambda$" should read --OR'- --; line 38, "randomnes" should read --randomness--. Column 14, line 18 "K $\approx$ 0.70b/$i_i$" should read "K $\approx$ 0.70b/$r_i$--.

Signed and Sealed this

Third Day of June 1980

[SEAL]

Attest:

SIDNEY A. DIAMOND

Attesting Officer

Commissioner of Patents and Trademarks